United States Patent
Uhr et al.

(10) Patent No.: US 10,164,779 B2
(45) Date of Patent: Dec. 25, 2018

(54) SYSTEM FOR ISSUING PUBLIC CERTIFICATE ON BASIS OF BLOCK CHAIN, AND METHOD FOR ISSUING PUBLIC CERTIFICATE ON BASIS OF BLOCK CHAIN BY USING SAME

(71) Applicant: Coinplug, Inc., Gyeonggi-do (KR)

(72) Inventors: Joon Sun Uhr, Gyeonggi-do (KR); Jay Wu Hong, Seoul (KR); Joo Han Song, Gyeonggi-do (KR)

(73) Assignee: Coinplug, Inc., Gyeonggi-do (KR)

( * ) Notice: Subject to any disclaimer, the term of this patent is extended or adjusted under 35 U.S.C. 154(b) by 0 days.

(21) Appl. No.: 16/008,359

(22) Filed: Jun. 14, 2018

(65) Prior Publication Data
US 2018/0294977 A1    Oct. 11, 2018

(30) Foreign Application Priority Data
Mar. 30, 2016    (KR) .................. 10-2016-0038068

(51) Int. Cl.
| | | |
|---|---|---|
| *H04L 9/32* | (2006.01) | |
| *H04L 9/06* | (2006.01) | |
| *G06F 17/30* | (2006.01) | |
| *H04L 9/08* | (2006.01) | |

(52) U.S. Cl.
CPC ...... *H04L 9/3265* (2013.01); *G06F 17/30097* (2013.01); *G06F 17/30327* (2013.01); *H04L 9/0637* (2013.01); *H04L 9/0643* (2013.01); *H04L 9/0861* (2013.01)

(58) Field of Classification Search
CPC ......... G06F 17/30097; G06F 17/30327; H04L 9/0637; H04L 9/0643; H04L 9/0861; H04L 9/3236–9/3242; H04L 9/3263–9/3268; H04L 63/0823; H04L 2209/38; H04L 2209/56
See application file for complete search history.

(56) References Cited

U.S. PATENT DOCUMENTS

| | | | |
|---|---|---|---|
| 2015/0206106 A1* | 7/2015 | Yago | G06Q 20/0658 705/68 |
| 2016/0342977 A1* | 11/2016 | Lam | G06Q 20/02 |

FOREIGN PATENT DOCUMENTS

| | | |
|---|---|---|
| JP | 2013020312 | 1/2013 |
| KR | 100411448 B1 | 12/2003 |
| KR | 100870202 B1 | 12/2008 |
| KR | 1020130019498 A | 2/2013 |
| KR | 1020150144645 A | 12/2015 |
| KR | 101661930 B1 | 10/2016 |

OTHER PUBLICATIONS

Bitcoin Technology, Used for Issuing Certificate, Bloter.net, Sep. 19, 2014, pp. 1-3, http://www.bloter.net/archives/207040>.

* cited by examiner

*Primary Examiner* — Kevin Bechtel
(74) *Attorney, Agent, or Firm* — Husch Blackwell LLP

(57) ABSTRACT

The present invention relates to a system for issuing a public certificate on the basis of a block chain, and a method for issuing a public certificate on the basis of a block chain by using same, the system comprising: a user terminal (100); a server (200) for requesting the issuance of a public certificate on the basis of a block chain; a server (300) for managing the public certificate on the basis of the block chain; and servers (400) having the block chain.

19 Claims, 17 Drawing Sheets

SYSTEM FOR ISSUING PUBLIC CERTIFICATE ON BASIS OF BLOCK CHAIN, AND METHOD FOR ISSUING PUBLIC CERTIFICATE ON BASIS OF BLOCK CHAIN BY USING SAME

CROSS REFERENCE TO RELATED APPLICATIONS

This application is a continuation of prior International Application PCT Application No. PCT/KR2016/011293 filed on Oct. 10, 2016, which claims the benefit of priority from Korean Patent Application No. 10-2016-0038068 filed on Mar. 30, 2016. The disclosures of International Application PCT Application No. PCT/KR2016/011293 and Korean Patent Application No. 10-2016-0038068 are incorporated herein by reference.

FIELD OF THE INVENTION

The present invention relates to a method of issuing a public certificate based on basis of a blockchain including a plurality of blockchain nodes; and more particularly, to the method including a step S100 of a user terminal sending specific personal information for issuing the public certificate to an issuance-requesting server for requesting an issuance of the public certificate on the basis of the blockchain, wherein the specific personal information includes user identification information needed for the issuance; a step S110 of the issuance-requesting server confirming the received specific personal information, creating a generation-guiding signal for guiding a creation of a specific private key for the public certificate and a specific public key for the public certificate, and sending the generation-guiding signal to the user terminal which requested the issuance; a step S120 of the user terminal, if the generation-guiding signal is received, managing a key-generating engine to generate the specific public key and the specific private key, and sending the specific public key to the issuance-requesting server; a step S130 of the issuance-requesting server receiving the specific public key and sending a registration-requesting signal for registering the public certificate for each user, the registration-requesting signal including the specific personal information and the specific public key, to a certificate-managing server for managing the public certificate; a step S140 of the certificate-managing server saving the specific personal information and the specific public key included in the received registration-requesting signal in a DB for registration information containing information regarding a registration of public certificates sequentially and cumulatively; a step S150 of the certificate-managing server confirming whether one of conditions is met, wherein the conditions include (i) a numeric condition and (ii) a temporal condition, and wherein the numeric condition represents a condition of determining whether the number of pairs, including a specific pair of the specific user's personal information and the specific public key and other pairs of associated users' personal information and associated public keys, reaches a needed number for creation of a root hash value and wherein the temporal condition represents a condition of completing each Merkle tree at predetermined intervals; a step S210 of the certificate-managing server, if said one of the conditions is met, operating a first hashing engine of the certificate-managing server to hash each of the pairs sequentially to thereby acquire each node hash information in a specific Merkle tree, and obtaining a specific root hash value for registration, which is used for registering the public certificate, by using said each node hash information; a step S220 of the certificate-managing server operating a transaction-processing engine to create (i) specific transaction information for monitoring forgery including the specific root hash value for registration and (ii) a specific transaction ID for monitoring forgery which is used as a key value to search the specific transaction information for monitoring forgery, and sending the specific transaction information for monitoring forgery to the blockchain; and a step S230 of the blockchain recording the received specific transaction information for monitoring forgery therein, to thereby complete the issuance, and a system using the same.

BACKGROUND OF THE INVENTION

In general, a public certificate is electronic information issued by a certificate authority (CA) for the purpose of confirming an identity of a user, and preventing transaction denials or forgery and falsification of a document upon the use of services in the various industrial fields, representing a kind of certificate of seal impression for a digital transaction. Such a certificate contains a version, a serial number, an effective period, an issuing institution of the certificate, information on verification of an e-signature of a user, a user's name, information on identification confirmation, an e-signature method, etc.

The certificate is used (Reference 1) in a public key infrastructure (PKI) as a standard security method.

The PKI is a set of roles, policies, and procedures needed to create, manage, distribute, use, store, and revoke certificates and manage public key encryption.

However, in the PKI, the private key used for decryption is generated and provided by the CA who is just a third party, not the user, therefore it is open to hacking, and as the user's private key exists in a form of a file at a storing location standardized by a soft token-based storing method, it is easy to copy and automatically collect the private key file and this has a risk of financial damages and user information theft caused by a leaked private key. Therefore, the CA who provides the generated private key to the user must have a certificate issuing system with a high security to minimize hacking attempts, which requires operation and maintenance and thus causes a high cost of the issuance.

In addition, the public certificate can be used only when ActiveX controls are installed in advance for the purpose of additional security for the user authentication process through a web browser. However, to install the ActiveX controls on a personal computer (PC), a security level of the PC must be lowered for the ActiveX controls to access resources including files, registry, etc. Due to the lowered security level of the user's PC caused by the Active X controls, the PC becomes vulnerable to the dangerous environment such as hacking.

Each of the problems associated with the public certificate is resolved by the public certificate issuance system based on the blockchain (refer to Patent Document 2), and a method using the same, and by the public certificate authenticating system based on the blockchain and a method using the same, from the applicant.

The conventional public certificate issuance system based on the blockchain and the method using the same, and the conventional public certificate authentication system based on the blockchain and the method using the same disclose a method for directly generating a public key and a private key for the public certificate within a user device operated by a user, the user device generating the public and private keys while the network is disconnected, preventing possible leakage of the keys by storing and managing the private key encrypted together with a photo image and a password selected by the user, where the public key, which requires maintenance, is stored and managed in the blockchain of the digital wallet in the blockchain server by using a distributed database based on peer-to-peer network (P2P), not a server managed by the CA thus an additional cost is minimized which is required for maintenance of the public certificate issuance system with the high security against hacking, and performing authentication even without the ActiveX controls.

Despite these advantages, a conventional accredited certificate issuance system and method based on blockchain, and a conventional accredited certificate authentication system and method based on the blockchain require an initial cost of issuance for storing and managing of the public key for the public certificate need for the authentication of the public certificate.

The initial cost is about 0.0001 bitcoin, and as of July 2015, 0.0001 bitcoin amounts to about mere 4 cents, however, this cost is charged every time the public certificate based on the blockchain is issued, thus this becomes a problem as the cost of the issuance increases in proportion to the increase of the issuance.

Additionally, the conventional accredited certificate issuance system and method and the conventional accredited certificate authentication system and method register, store, and manage the public key in more than 0.1 million blockchain nodes to prevent forgery of the public key.

That is, the broadcast of the transaction information including the public key is defined by a protocol, and if the transaction information including the public key occurs, one node, i.e., a blockchain node, broadcasts initial transaction information including the public key to eight designated nodes, then each of the eight designated nodes that received the information broadcasts again to another eight designated nodes in a pyramidic fashion, and the broadcast is completed when the information is transmitted to all of the blockchain nodes which have the digital wallets containing the blockchain required for bitcoin payment.

Due to these reasons, the conventional accredited certificate issuance system and method and the conventional accredited certificate authentication system and method have a risk of network overload caused by traffic of transaction information including the public keys when requests for registering the public keys rush in, and exposure of the public keys because the transaction information including the public keys stored in the blockchain nodes is open to public.

PRIOR ART

Cited Patent Literature

Cited Patent Literature 1: Korean Patent Publication No. 10-0411448 registered on Dec. 3, 2003
Cited Patent Literature 1: Korean Patent Laid-Open Publication No. 10-2015-0109320 filed on Aug. 3, 2015

SUMMARY OF THE INVENTION

It is an object of the present invention to solve all the aforementioned problems. It is another object of the present invention to provide a method of remove a constructing cost, a cost to construct a system for issuing a public certificate which is prepared to link with high level of security system to block hacking as much as possible when the hacking occurs, due to the fact that in the case of a public key for the public certificate which requires maintenance, is saved and managed on a blockchain through a peer-to-peer (P2P) network based distributed database instead of being saved and managed on a Certificate Authority (CA) operating server, to remove system related costs such as operating & maintenance cost of the constructed system for issuing the public certificate on a basis of the blockchain, and to greatly reduce an issuing cost when issuing the public certificate.

It is still another object of the present invention to bind the specific user's specific public key for the public certificate as much as the predetermined number of public keys, to compress the bound one or more specific public keys, and to register specific transaction information that includes the compressed specific user's specific public key list in order to minimize the occurrence of traffics, to thereby also minimizing the network overload while registering the specific transaction information to the blockchain which the specific transaction information includes the specific user's public key in the process of issuing the public certificate.

It is still yet another object of the present invention to perform an authentication process, when issuing the public certificate, of the public certificate while not registering the specific user's specific public key to the blockchain, and is able to monitor forgery and falsification of public authentication related information that includes the specific public key of the specific user.

In accordance with one aspect of the present invention, there is provided a system for issuing a public certificate based on a blockchain, including: a user terminal generating a specific public key for the public certificate and a specific private key for the public certificate, and transmitting the specific public key and specific personal information for issuing the public certificate including personal information on a specific user, required for issuing the public certificate; an issuance-requesting server receiving the specific personal information and the specific public key from the user terminal, and transmitting a registration-requesting signal for registering the public certificate for each user including the specific personal information and the specific public key; a certificate-managing server (i) storing, for each user, sequentially and cumulatively the specific public key and the specific personal information included in the registration-requesting signal from the issuance-requesting server in the DB for registration information, (ii) if one of conditions is met, instructing its first hashing engine to sequentially hash each of pairs of the specific public key and the specific personal information to acquire each piece of node hash information in a specific Merkle tree, (iii) obtaining at least one specific root hash value for registration of the public certificate of a specific Merkle tree by using said each piece of the node hash information, (iv) instructing its transaction-processing engine to generate (iv-1) transaction information for monitoring forgery including the at least one specific root hash value and (iv-2) a transaction ID for monitoring forgery used as a key value for searching the transaction information for monitoring forgery, and (v) transmitting the transaction information for monitoring forgery; and the blockchain, including blockchain nodes, storing the transaction information for monitoring forgery received from the certificate-managing server, wherein the blockchain nodes authorize a cryptocurrency payment through verification of transaction information for cryptocurrency payment if the transaction information for the cryptocurrency payment is received, and store the transaction information for the cryptocurrency payment in the blockchain by referring to a result of the authorizing process; wherein, the conditions include (i) a numeric condition representing a condition of determining whether the number of the pairs, including (i-1) a specific pair of the specific user's personal information and the specific public key and (i-2) other pairs of associated users' personal information and associated public keys, reaches a needed number for creation of a root hash value, and (ii) a temporal condition representing a condition of completing each Merkle tree at predetermined intervals.

In accordance with another aspect of the present invention, there is provided a method of issuing a public certificate based on basis of a blockchain including a plurality of blockchain nodes, including: a step S100 of a user terminal sending specific personal information for issuing the public certificate to an issuance-requesting server for requesting an issuance of the public certificate on the basis of the blockchain, wherein the specific personal information includes user identification information needed for the issuance; a step S110 of the issuance-requesting server confirming the received specific personal information, creating a generation-guiding signal for guiding a creation of a specific private key for the public certificate and a specific public key for the public certificate, and sending the generation-guiding signal to the user terminal which requested the issuance; a step S120 of the user terminal, if the generation-guiding signal is received, managing a key-generating engine to generate the specific public key and the specific private key, and sending the specific public key to the issuance-requesting server; a step S130 of the issuance-requesting server receiving the specific public key and sending a registration-requesting signal for registering the public certificate for each user, the registration-requesting signal including the specific personal information and the specific public key, to a certificate-managing server for managing the public certificate; a step S140 of the certificate-managing server saving the specific personal information and the specific public key included in the received registration-requesting signal in a DB for registration information containing information regarding a registration of public certificates sequentially and cumulatively; a step S150 of the certificate-managing server confirming whether one of conditions is met, wherein the conditions include (i) a numeric condition and (ii) a temporal condition, and wherein the numeric condition represents a condition of determining whether the number of pairs, including a specific pair of the specific user's personal information and the specific public key and other pairs of associated users' personal information and associated public keys, reaches a needed number for creation of a root hash value and wherein the temporal condition represents a condition of completing each Merkle tree at predetermined intervals; a step S210 of the certificate-managing server, if said one of the conditions is met, operating a first hashing engine of the certificate-managing server to hash each of the pairs sequentially to thereby acquire each node hash information in a specific Merkle tree, and obtaining a specific root hash value for registration, which is used for registering the public certificate, by using said each node hash information; a step S220 of the certificate-managing server operating a transaction-processing engine to create (i) specific transaction information for monitoring forgery including the specific root hash value for registration and (ii) a specific transaction ID for monitoring forgery which is used as a key value to search the specific transaction information for monitoring forgery, and sending the specific transaction information for monitoring forgery to the blockchain; and a step S230 of the blockchain recording the received specific transaction information for monitoring forgery therein, to thereby complete the issuance.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
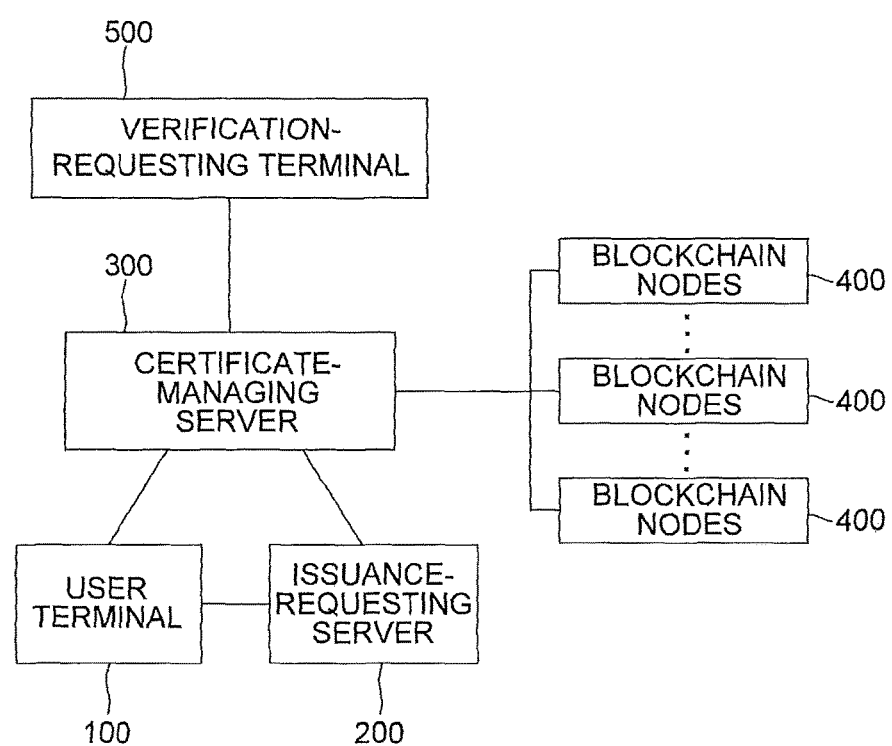
FIG. 1 is a block diagram illustrating a system for issuing a public certificate based on a blockchain in accordance with the present invention.

The embodiments below of the present invention will be described in sufficient detail by referring to attached drawings regarding configurations and effects of the embodiments, and in the drawings, like numerals refer to the same or similar functionality throughout the several views. Throughout the specification, a term "specific" used to designate an object corresponding to a specific user may be omitted.

The present invention includes part for issuance and part for authentication of a public certificate based on a blockchain.

Figure 2:
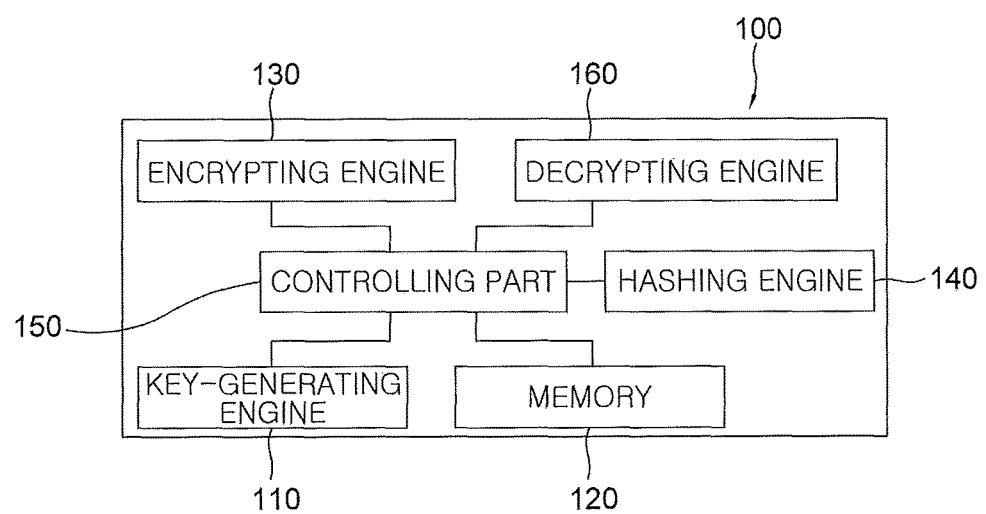
FIG. 2 is a block diagram illustrating a detailed configuration of a user terminal of the system for issuing the public certificate based on the blockchain in accordance with the present invention.
Figure 3:
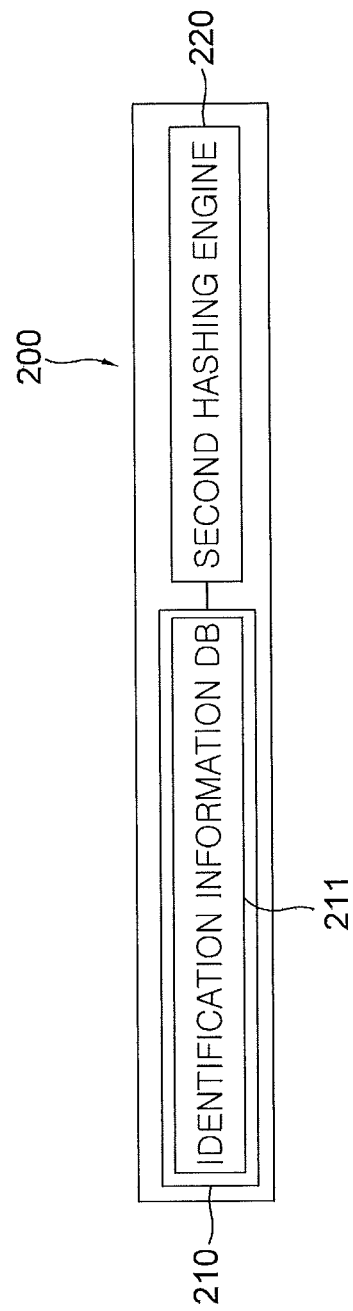
FIG. 3 is a block diagram illustrating a detailed configuration of an issuance-requesting server of the system for issuing the public certificate based on the blockchain in accordance with the present invention.
Figure 4:
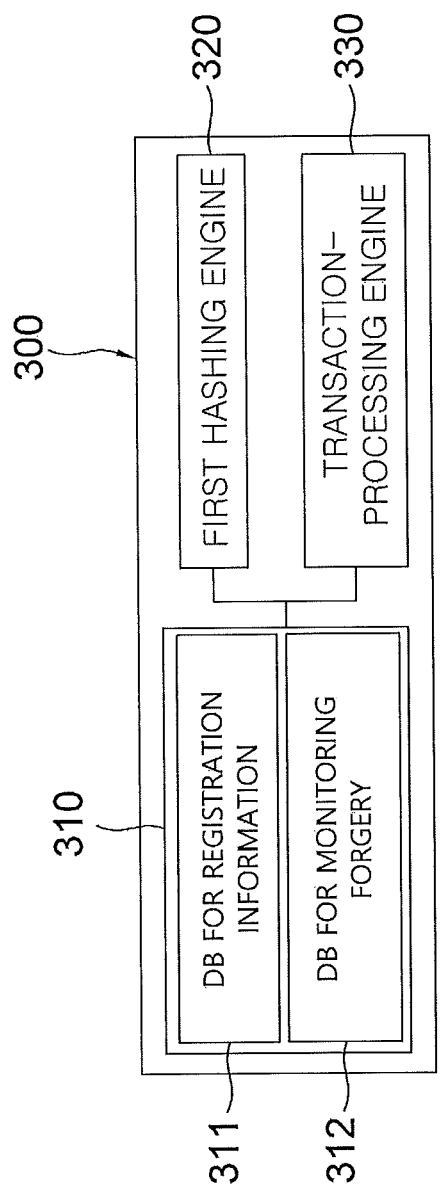
FIG. 4 is a block diagram illustrating a detailed configuration of a certificate-managing server of the system for issuing the public certificate based on the blockchain in accordance with the present invention.
Figure 5:
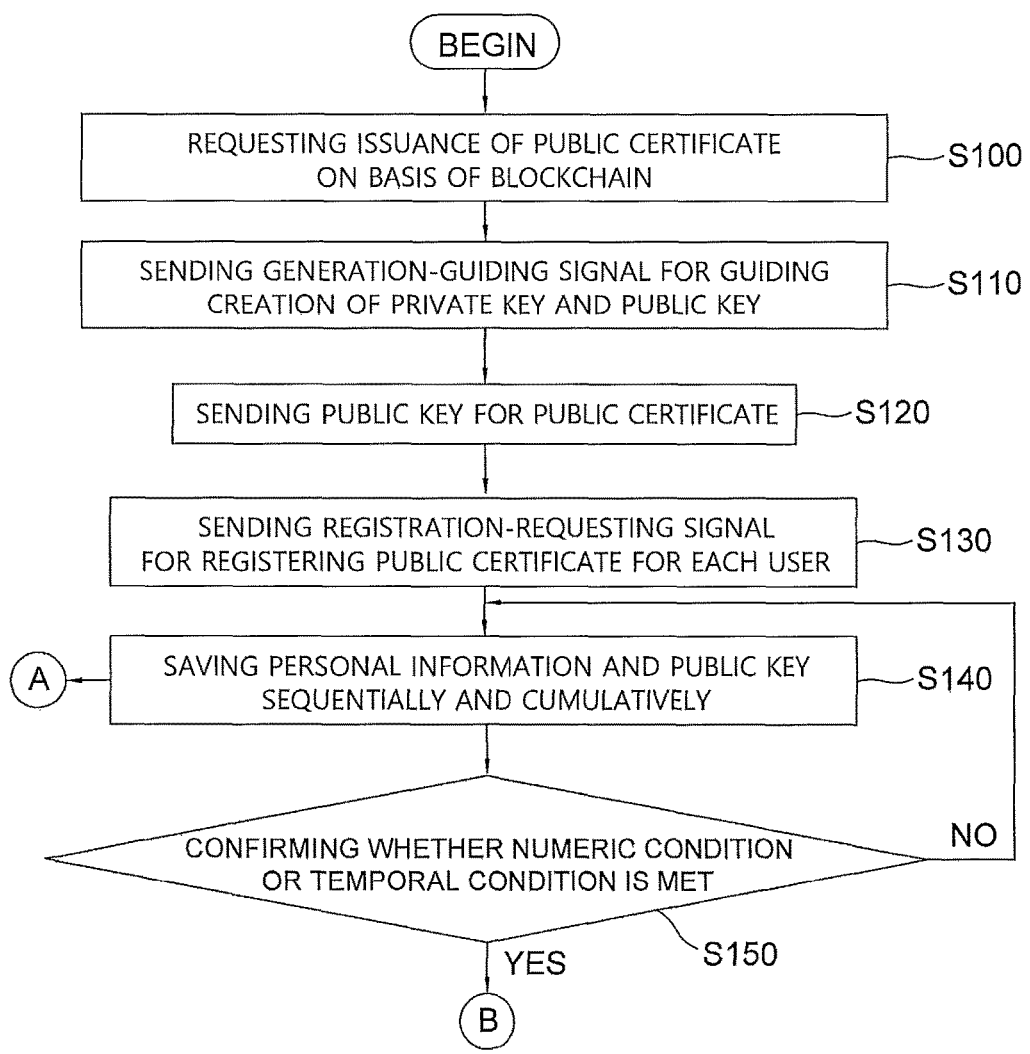
FIGS. 5 to 8 are sequence diagrams illustrating a process of the issuance of the public certificate by using the system for issuing the public certificate based on the blockchain in accordance with the present invention.
Figure 6:
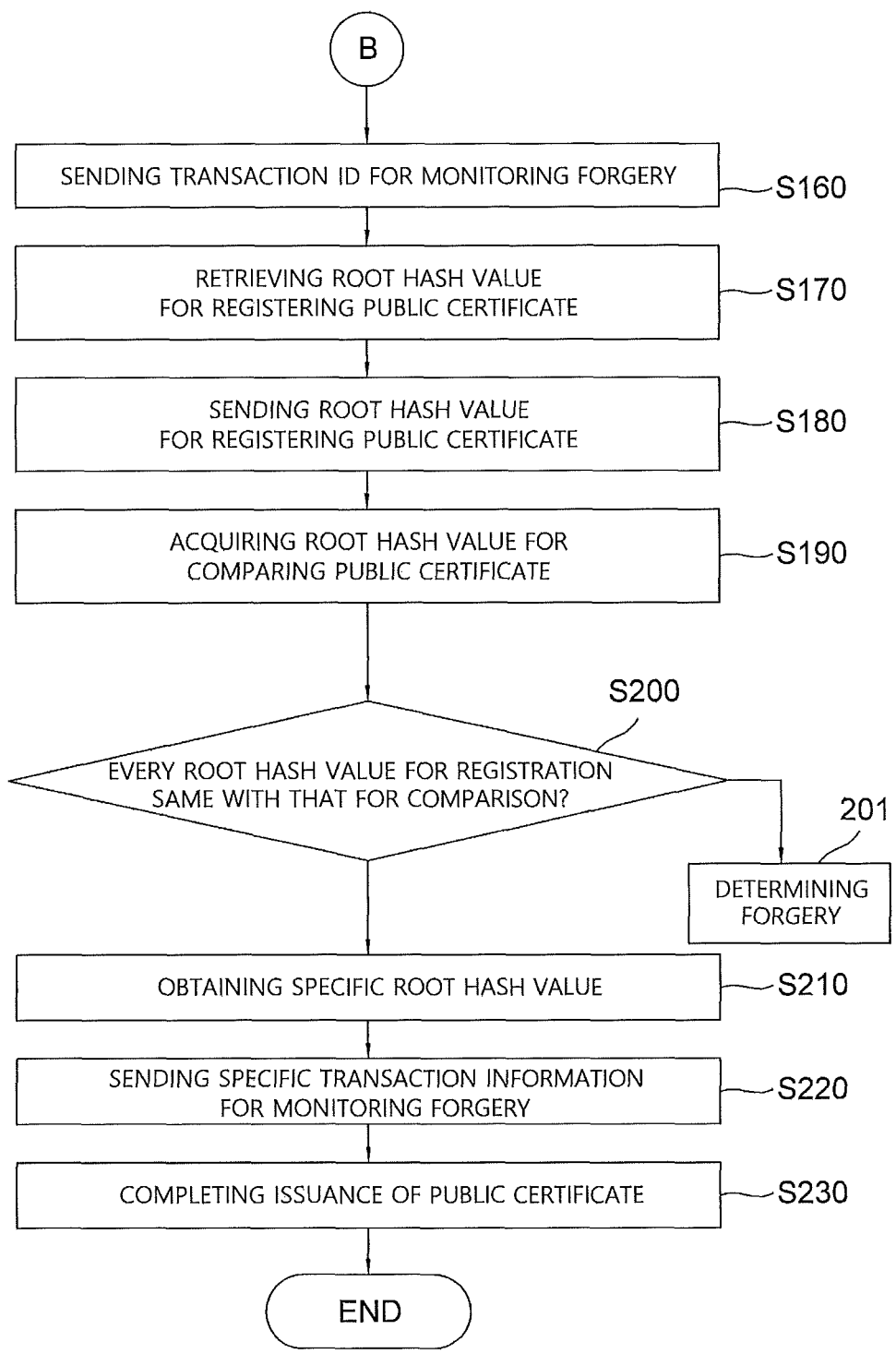
Figure 7:
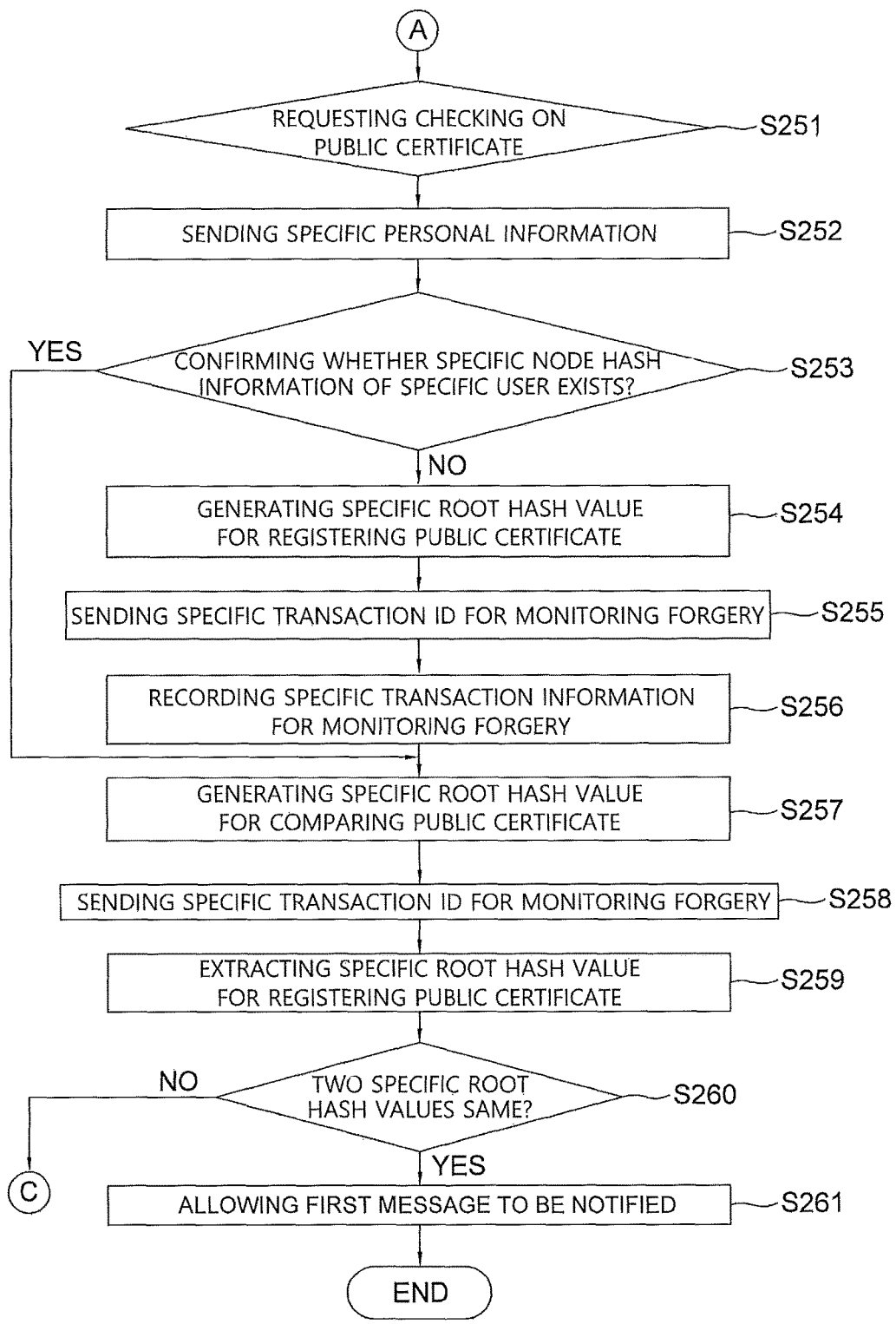
Figure 8:
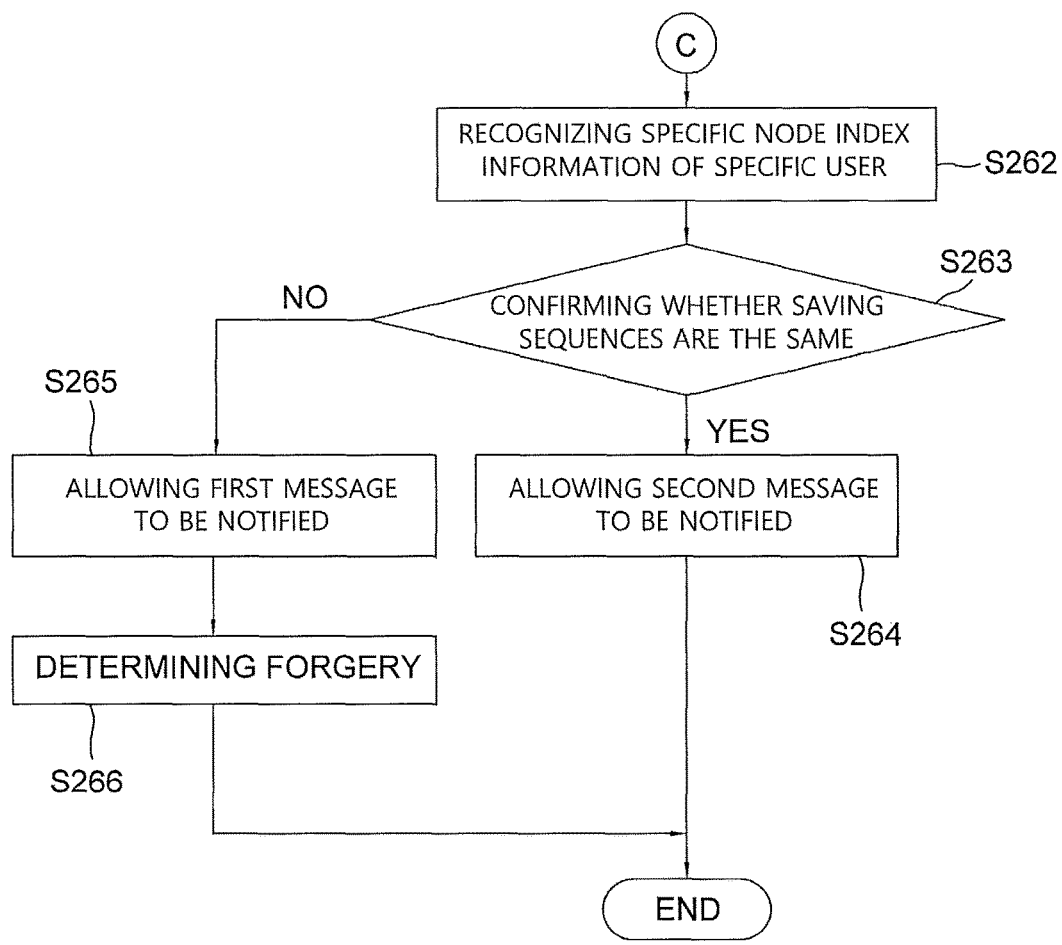

Herein, FIGS. 1 to 8 may illustrate a system for issuing the public certificate based on the blockchain which may be a part of the first part.

As illustrated, the system for issuing the public certificate based on the blockchain in accordance with the present invention may include a user terminal 100, an issuance-requesting server 200, a certificate-managing server 300, and blockchain nodes 400.

First of all, the user terminal 100 may generate a specific public key for the public certificate and a specific private key for the public certificate, may send the specific public key and specific personal information for issuing the public certificate. Herein, the specific personal information may include at least one of a name of the specific user, a birth date of the specific user, a phone number of the specific user, and an email address of the specific user.

The user terminal 100 performing such functions may be comprised of a key-generating engine 110 to generate the specific public key and the specific private key, a memory 120 where the generated specific private key is saved, an encrypting engine 130, a hashing engine 140, a decrypting engine 160, and a controlling part 150 which manages the key-generating engine 110, the encrypting engine 130, the hashing engine 140, and the decrypting engine 160.

If the user terminal 100 is in a form of desktop computer, such as PC, then the key-generating engine 110, the encrypting engine 130, the hashing engine 140, and the decrypting engine 160 may be loaded in a form of application, and if the user terminal 100 is a mobile device such as a smart phone that is able to access the Internet, these engines may be loaded in the form of application exclusively used for mobile devices.

Before generating the specific public key and the specific private key, the user terminal 100 may confirm whether the specific user operating the user terminal 100 has registered the specific user identification information in the issuance-requesting server 200.

In order to do so, a DB part 210 may be loaded on the issuance-requesting server 200 and the specific user identification information on the specific user who is operating the user terminal 100 is saved on the DB part 210 which may also include an identification information DB 211 which contains the specific personal information that has been matched with the specific user identification information.

Then, the user terminal 100 may send the specific personal information to the issuance-requesting server 200 to request the issuance of the public certificate. The issuance-requesting server 200 may compare the received specific user personal information with information stored in the identification information DB 211, and if identical information exists, may generate and transmit a generation-guiding signal that guides generation of the specific public key and the specific private key to the user terminal 100.

If the generation-guiding signal is received from the issuance-requesting server 200, the user terminal 100 may instruct the key-generating engine 110 to generate the specific public key and the specific private key, where the user terminal 100 may allow the specific public key and the specific private key to be generated while the network is being disconnected to prevent possible leakage of the keys.

The issuance-requesting server 200 may receive the specific personal information and the specific public key from the user terminal 100, and may transmit a registration-requesting signal for registering the public certificate for each user including the specific personal information and the specific public key, to the certificate-managing server 300 for managing the public certificate described later.

Herein, the issuance-requesting server 200 may include its hashing engine 220 which may hash the specific personal information to thereby acquire and transmit user-identifying hash information to the certificate-managing server 300.

The issuance-requesting server 200 with such functions may be a server of a company whose service requires the public certificate, like a server of a bank or a securities firm, a server of a government institution, or a server of an on-line Internet shopping mall.

The certificate-managing server 300 may store, for each user, sequentially and cumulatively the public key and the personal information included in the registration-requesting signal from the issuance-requesting server 200 in the DB 311 for registration information, and if one of conditions is met, may instruct its first hashing engine 320 to sequentially hash each of pairs to acquire each piece of node hash information in a specific Merkle tree, and may obtain a specific root hash value for registration of the public certificate by using said each piece of the node hash information, may instruct its transaction-processing engine 320 to generate (i) transaction information for monitoring forgery including the specific root hash value for registration and (ii) a transaction ID for monitoring forgery used as a key value for searching the transaction information for monitoring forgery and may transmit the transaction information for monitoring forgery. Herein, the conditions may include (i) a numeric condition and (ii) a temporal condition, where the numeric condition represents a condition of determining whether the number of pairs, including a specific pair of the specific user's personal information and a specific public key and other pairs of associated users' personal information and associated public keys, reaches a pre-determined number required for creation of a root hash value, and the temporal condition represents a condition of completing each Merkle tree at predetermined intervals.

Herein, the DB 311 for registration information may be managed by a DB part 310.

Also, in addition to the personal information for each user and the public key, the DB 311 for registration information may store sequentially and cumulatively the node hash information by user acquired by hashing the specific personal information and the specific public key, and identification information of the specific root hash value for registration, wherein the specific root hash value is a root hash value of a Merkle tree containing the stored node hash information.

Also, the DB part 310 may include a DB 312 for monitoring forgery where a transaction ID for monitoring forgery generated as an identifier along with the transaction information for monitoring forgery every time the transaction information for monitoring forgery is generated at the transaction-processing engine 330, and the identification information of the specific root hash value for registration, are stored cumulatively per user.

Also, if said one of the conditions is met, the certificate-managing server 300 may start over the count of the specific personal information and the specific public key stored in the DB 311 for registration information, thus may allow new users requesting the public certificates to be issued the public certificates.

Herein, said one of the conditions may be the numeric condition where a system administrator collects a predetermined number of the pairs, required for the creation of the root hash value, including the specific pair and said other pairs. By compressing and processing the transactions of information on the public certificates of the users, the network traffic may be minimized and the network overload may be reduced.

Such the conditions may vary, and may be a predetermined number of pieces of the node hash information, or may be the number of pieces of the node hash information stored within a predetermined time period.

Meanwhile, the certificate-managing server 300 may monitor the specific personal information and the specific public key stored in the DB 311 for registration information to detect forgery during the process of the issuance, to thereby react by detecting forgery of any personal information or any public key due to illegal activities like hacking.

For this purpose, if said one of the conditions is met, the certificate-managing server 300 may extract all of previous transaction IDs of previous Merkle trees that have been cumulatively saved before the completion of the specific Merkle tree in the DB 312 for monitoring forgery, and may send the previous transaction IDs to the blockchain comprised of the blockchain nodes 400.

The blockchain nodes 400 may retrieve the specific transaction information for monitoring forgery therefrom by referring to the specific transaction ID for monitoring forgery, may extract the specific root hash value for registration included in the specific transaction information for monitoring forgery, and may send the specific root hash value for registration to the certificate-managing server 300.

Thereafter, the certificate-managing server 300 may receive the specific root hash value for registration, and may divide the number of the pairs of the public keys and the personal information for each user sequentially and cumulatively stored, to be corresponding to the root hash value, in the DB 311 for registration information into a predetermined root hash generating interval.

Thereafter, the certificate-managing server 300 may use its hashing engine 320 to hash the predetermined number of the pairs of the public keys and the personal information, to thereby acquire the root hash value for comparison.

Thereafter, the certificate-managing server 300 may pair the transmitted root hash value for registration with the generated root hash value for comparison, with respect to their generation sequence.

Thereafter, the certificate-managing server 300 may compare each hash value of the root hash value for registration with each hash value of the root hash value for comparison aligned according to their generation sequence, and may determine if each hash value is identical to each other from the first to the last in the sequence.

If every hash value is determined as identical to each other within each pair, the hashing engine 320 of the certificate-managing server 300 may determine that no forgery occurred of information related to the public certificate issued to the users, that is, the certificate-managing server 300 may determine that a Merkle tree comprised of the pairs with identical elements is authentic, and may allow the transaction information for monitoring forgery to be generated.

However, if there is a pair whose hash values are different, the certificate-managing server 300 may determine that forgery of the information related to the public certificate occurred, and may prevent the transaction information for monitoring forgery from being generated, and may perform processes of handling the forgery.

Further, when the node hash information is being generated by the first hashing engine 320, the certificate-managing server 300 may generate node index information representing saving sequence of the generated node hash information, and may also generate the identification information of the specific root hash value for registration when the specific root hash value for registration is being generated.

Also, the certificate-managing server 300 may store cumulatively, per user, in the DB 311 for registration information the node hash information, the node index information, and the identification information of the specific root hash value for registration, and may further store cumulatively, per user, the identification information of the specific root hash value for registration in the DB 312 for monitoring forgery.

Then, the issuance-requesting server 200 may store cumulatively, per user, the transaction ID for monitoring forgery generated at the transaction-processing engine 320 in the DB 312 for monitoring forgery, to thereby instruct the DB 312 for monitoring forgery to store and manage, per user, the transaction ID for monitoring forgery and the identification information of the specific root hash value for registration.

Meanwhile, the more the root hash values in the blockchain comprised of the blockchain nodes 400 are connected to each other, the more difficult the forgery becomes.

On condition that a certain previous root hash value has been allotted to a first leaf node of a particular previous Merkle tree, the certificate-managing server 300 may use the first hashing engine 320 to obtain a particular previous root hash value for registration the public certificate of the particular previous Merkle tree.

In case of the root hash value for registration included in the transaction information for monitoring forgery stored in the blockchain of the blockchain nodes 400, its structure shows a connected chain of the root hash value from the firstly-registered to the lastly-registered, thus, if the number of the transaction information for monitoring forgery stored in the blockchain of the blockchain nodes 400 increases, the certificate-managing server 300 may make it difficult to forge the personal information and the public key by the illegal activities.

Also, auditors of the public certificate who are related to the government institutions may request an audit via a verification-requesting terminal 500 to confirm whether the information related to the public certificate is forged.

For this purpose, the auditors may operate the verification-requesting terminal 500 to transmit a request for monitoring the public certificate of the specific user to the issuance-requesting server 200.

Thereafter, the issuance-requesting server 200 may extract the specific personal information on the specific user who requested the monitoring from the identification information DB 211, and transmit the specific personal information to the certificate-managing server 300.

The certificate-managing server 300 may confirm a presence of the specific node hash information of the specific user in the DB 311 for registration information by referring to the specific personal information on the specific user who requested the monitoring.

Thereafter, if the specific node hash information does not exist, the certificate-managing server 300 may operate the first hashing engine 320 to sequentially hash each of the pairs that does not have node hash information to thereby acquire node hash information of the pairs that do not have node hash information.

Thereafter, the certificate-managing server 300 may generate the node index information representing the saving sequence of the node hash information generated at the first hashing engine 320, may acquire the specific root hash value for registration, and may generate the identification information of the specific root hash value used for identifying the acquired specific root hash value for registration.

Thereafter, the certificate-managing server 300 may operate the transaction-processing engine 320 to create (i) the transaction information for monitoring forgery acquired from the pairs that do not have node hash information and (ii) the transaction ID for monitoring forgery, acquired from the pairs that do not have node hash information, which is used as a key value to search the transaction information for monitoring forgery, and transmit the transaction information for monitoring forgery to the blockchain nodes 400.

The blockchain comprised of the blockchain nodes 400 may store the transmitted transaction information for monitoring forgery in the blockchain, that is, the distributed database of each of the blockchain nodes 400.

Then, the first hashing engine 320 of the certificate-managing server 300 may generate the specific root hash value for comparison by referring to a structure of the specific Merkle tree and the identification information of the specific root hash value for registration.

Thereafter, the certificate-managing server 300 may transmit the transaction ID for monitoring forgery to the blockchain by referring to the identification information of the specific root hash value for registration. Herein, the transaction ID for monitoring forgery may be received by any one of the blockchain nodes 400 distributed throughout the world, and may be received by a node pre-designated for efficiency.

Thereafter, at least one blockchain node among the blockchain nodes 400 may retrieve the transaction information for monitoring forgery from the distributed DB of the blockchain by referring to the transaction ID for monitoring forgery, may extract the specific root hash value for registration included in the retrieved transaction information for monitoring forgery, and may transmit the specific root hash values for registration to the certificate-managing server 300.

Thereafter, the certificate-managing server 300 may receive the specific root hash value for registration, and may compare a hash value of the received specific root hash value for registration with a hash value of the specific root hash value for comparison, to thereby determine whether the specific Merkle tree is authentic, that is, the certificate-managing server may determine whether the two hash values are identical to each other.

Thereafter, if the specific Merkle tree is determined as authentic, the certificate-managing server 300 may allow a first message to be notified, which represents that the specific personal information and the specific public key of the specific user, who requested the checking to the verification-requesting terminal 500, have not been forged.

Meanwhile, if the specific Merkle tree is determined as not authentic, the certificate-managing server 300 may confirm whether (i) the saving sequence of the specific node hash information that determined the specific Merkle tree as not authentic, and (ii) the saving sequence of the specific user's node hash information are the same.

Thereafter, if (i) the saving sequence of the specific node hash information that determined the specific Merkle tree as not authentic and (ii) the saving sequence of the specific user's node hash information are the same, the certificate-managing server 300 may allow a second message to be notified to the verification-requesting terminal 500, where the second message represents that the specific personal information and the specific public key of the specific user have been forged.

Thereafter, if the saving sequence of the specific node hash information, among the node hash information corresponding to the specific root hash value for registration, that determined the specific Merkle tree as not authentic and the saving sequence of the specific user's node hash information are not the same, the certificate-managing server 300 may allow the first message to be notified to the verification-requesting terminal 500.

A process of the issuance of the public certificate based on the blockchain by using the system for issuing the public certificate based on the blockchain in accordance with the present invention is described as follows.

First, the user may access the issuance-requesting server 200 by way of the user terminal 100 and may transmit the specific personal information for the issuance, where the specific personal information includes specific user identification information required for the issuance, to thereby request the issuance, at a step of S100.

The issuance-requesting server 200 may confirm the received specific personal information, may create a generation-guiding signal for guiding a creation of a specific private key for the public certificate and a specific public key for the public certificate, and may transmit the generation-guiding signal to the user terminal 100 which requested the issuance, at a step of S110.

If the generation-guiding signal is received, the user terminal 100 may manage a key-generating engine 110 to generate the specific public key and the specific private key, may store the specific private key in the memory 120, and may transmit the specific public key to the issuance-requesting server 200, at a step of S120.

The issuance-requesting server 200 may receive the specific public key, may send a registration-requesting signal for registering the public certificate for each user, the registration-requesting signal including the specific personal information and the specific public key, to the certificate-managing server 300, at a step of S130, and may instruct its hashing engine 220 to hash the specific personal information, to thereby acquire and transmit user-identifying hash information.

The certificate-managing server 300 may store the specific personal information and the specific public key included in the received registration-requesting signal in the DB 311 for registration information sequentially and cumulatively, at a step of S140.

Thereafter, the certificate-managing server 300 may confirm whether said one of the conditions is met, at a step of S150.

First, if none of said one of the conditions is met, the certificate-managing server 300 may continue checking whether said one of the conditions is met.

And if said one of the conditions is met, the certificate-managing server 300 may extract all of previous transaction IDs for monitoring forgery of previous Merkle trees that have been cumulatively saved before the completion of the specific Merkle tree in the DB 312 for monitoring forgery, and may transmit the previous transaction IDs for monitoring forgery to the blockchain nodes 400, at a step of S160.

The blockchain nodes 400 may retrieve each piece of the previous transaction information for monitoring forgery from the blockchain, i.e., the distributed DB, by referring to said each piece of the received previous transaction IDs for monitoring forgery and may extract each of previous root hash values for registration of previous public certificates included in said each piece of the previous transaction information for monitoring forgery, at a step of S170.

Thereafter, the blockchain nodes 400 may transmit said each of the previous root hash values for registration to the certificate-managing server 300, at a step of S180.

After receiving said each of the previous root hash values for registration, the certificate-managing server 300 may hash previous pairs of each previous user's personal information and each previous user's public keys that have been cumulatively saved before the completion of the specific Merkle tree from the DB 311 for registration information, to thereby acquire each of previous root hash values for comparison, at a step of S190.

Thereafter, the certificate-managing server 300 may compare said each of the previous root hash values for registration with said each of the previous root hash values for comparison sequentially, to thereby determine whether the previous Merkle trees are authentic, at a step of S200.

Meanwhile, if the previous Merkle trees are determined as not authentic, the certificate-managing server 300 may detect the fact that the specific personal information and the specific public key are forged, and may perform processes of handling the forgery.

Also, if the previous Merkle trees are determined as authentic, the certificate-managing server 300 may instruct the first hashing engine 320 to hash each of the pairs to thereby acquire the node hash information of the pairs satisfying the numeric condition.

Thereafter, the certificate-managing server 300 may use the first hashing engine 320 to acquire root hash value for registration of a Merkle tree including the node hash information, at a step of S210.

Thereafter, the certificate-managing server 300 may instruct the transaction-processing engine 320 to create (i) the transaction information for monitoring forgery acquired from the pairs that do not have node hash information and (ii) the transaction ID for monitoring forgery, acquired from the pairs that do not have node hash information, which is used as a key value to search the transaction information for monitoring forgery, and transmit the transaction information for monitoring forgery to the blockchain nodes 400, at a step of S220.

Herein, on condition that a certain previous root hash value has been allotted to a first leaf node of a particular previous Merkle tree, the certificate-managing server 300 may use the first hashing engine 320 to obtain a particular previous root hash value for registration of the particular previous Merkle tree.

The blockchain nodes 400 may store the received specific transaction information for monitoring forgery therein, i.e., the distributed DB in the blockchain nodes 400, to thereby complete the issuance, at a step of S230.

Also, the auditors may request the audit via the verification-requesting terminal 500 to confirm whether information related to the public certificate is forged.

For this purpose, the issuance-requesting server 200 may instruct the verification-requesting terminal 500 to determine whether monitoring of the public certificate is requested, at a step of S251, and if the monitoring is determined to have been requested, the issuance-requesting server 200 may extract the specific personal information of the specific user who requested the monitoring thereon from the identification information DB 211, and may transmit the specific personal information to the certificate-managing server 300, at a step of S252.

Thereafter, the certificate-managing server 300 may confirm whether the specific node hash information of the specific user is present in the DB 311 for registration information by referring to the specific personal information, at a step S253.

If the specific node hash information is determined as present in the DB 311, then the certificate-managing server 300 may enter a step of S257 described later, where the root hash information for comparison is generated.

Thereafter, if the specific node hash information does not exist, the certificate-managing server 300 may operate the first hashing engine 320 to hash each of the pairs that does not have node hash information, to thereby acquire node hash information of the pairs that do not have node hash information.

Thereafter, the certificate-managing server 300 may generate the node index information representing the saving sequence of the node hash information generated at the first hashing engine 320, may acquire the specific root hash value for registration, and may generate the identification information of the specific root hash value for registration used for identifying the acquired specific root hash value for registration, at a step of S254.

Thereafter, the certificate-managing server 300 may instruct the transaction-processing engine 320 to create (i) the transaction information for monitoring forgery acquired from the pairs that do not have node hash information and (ii) the transaction ID for monitoring forgery, acquired from the pairs that do not have node hash information, which is used as a key value to search the transaction information for monitoring forgery, and may transmit the transaction information for monitoring forgery to the blockchain, at a step of S255.

The blockchain nodes 400 may store the received transaction information for monitoring forgery in the blockchain, i.e., the distributed DB, at a step of S256.

Then, the first hashing engine 320 of the certificate-managing server 300 may generate the specific root hash value for comparison by referring to a structure of the specific Merkle tree and the identification information of the specific root hash value for registration, at a step of S257.

Thereafter, the certificate-managing server 300 may transmit the specific transaction ID for monitoring forgery to the blockchain by referring to the identification information of the specific root hash value for registration, at a step of S258.

Thereafter, the blockchain nodes 400 may retrieve the transaction information for monitoring forgery therefrom, i.e., the distributed DB, by referring to the transaction ID for monitoring forgery, may extract the specific root hash value for registration included in the transaction information for monitoring forgery, and may transmit the specific root hash values for registration to the certificate-managing server 300, at a step of S259.

Thereafter, the certificate-managing server 300 may receive the specific root hash value for registration, and may compare the received specific root hash value for registration with the specific root hash value for comparison, to thereby determine whether the specific Merkle tree is authentic, at a step of S260.

Thereafter, if the specific Merkle tree is determined as authentic, the certificate-managing server 300 may allow the first message to be notified, which represents that the specific personal information and the specific public key of the specific user, who requested the monitoring to the verification-requesting terminal 500, have not been forged, at a step of S261.

If a hash value of the root hash value for registration is not identical to a hash value of the root hash value for comparison, the certificate-managing server 300 may identify the node index information of the specific user among the node hash information which comprises a Merkle tree of the root hash value including the node hash information of the specific user, at a step of S262, and may confirm whether the saving sequence of the specific node hash information that determined the specific Merkle tree as not authentic and the saving sequence of the specific user's node hash information are the same, at a step of S263.

If (i) the saving sequence of the specific node hash information that determined the specific Merkle tree as not authentic and (ii) the saving sequence of the specific user's node hash information are the same, the certificate-managing server 300 may allow the second message to be notified to the verification-requesting terminal 500, where the second message represents that the specific personal information and the specific public key of the specific user have been forged, at a step of S264.

Thereafter, if the saving sequence of the specific node hash information, among the node hash information corresponding to the specific root hash value for registration, that determined the specific Merkle tree as not authentic and the saving sequence of the specific user's node hash information are not the same, the certificate-managing server 300 may allow the first message to be notified to the verification-requesting terminal 500, at a step of S265.

Thereafter, the certificate-managing server 300 may determine the specific pair and the other pairs that correspond to the specific Merkle tree as not authentic, the specific Merkle tree including pieces of the specific user's node hash information that have been cumulatively managed on the DB 311 for registration information, at a step of S266, and may perform handling of the forgery.

Figure 9:
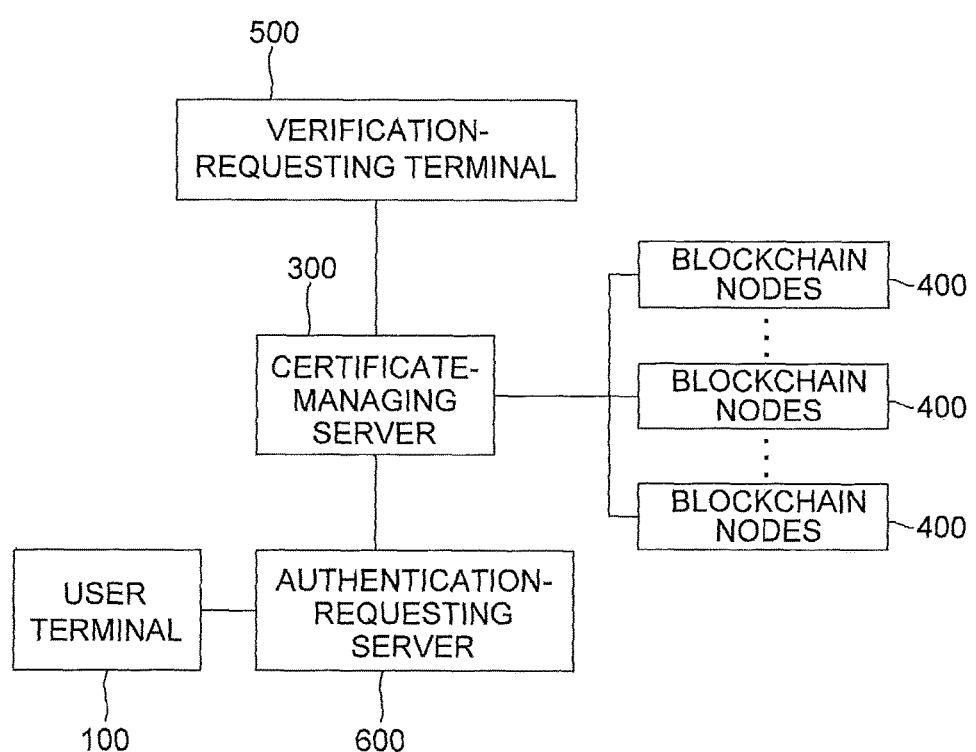
FIG. 9 is a block diagram illustrating a system for authenticating the public certificate based on the blockchain in accordance with the present invention.
Figure 10:
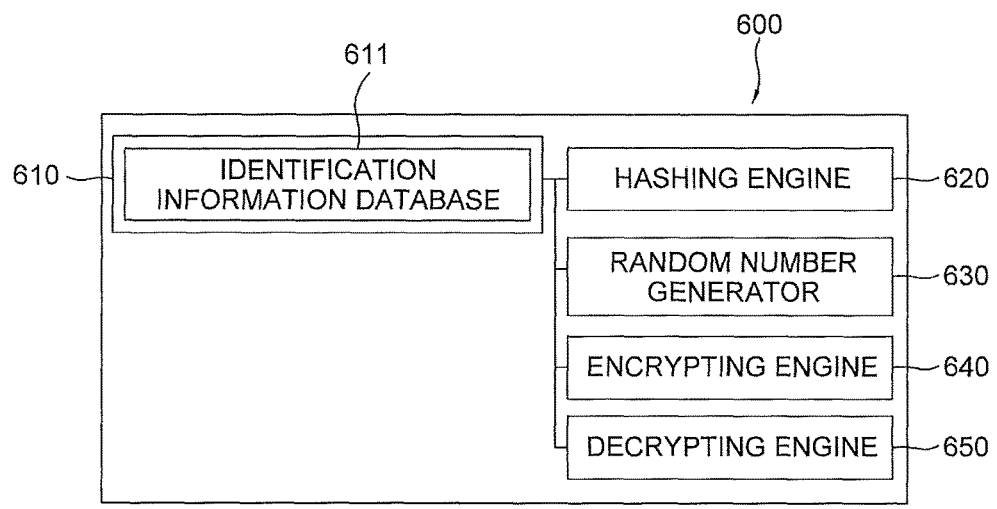
FIG. 10 is a block diagram illustrating a detailed configuration of an authentication-requesting server of the system for authenticating the public certificate based on the blockchain in accordance with the present invention.
Figure 11:
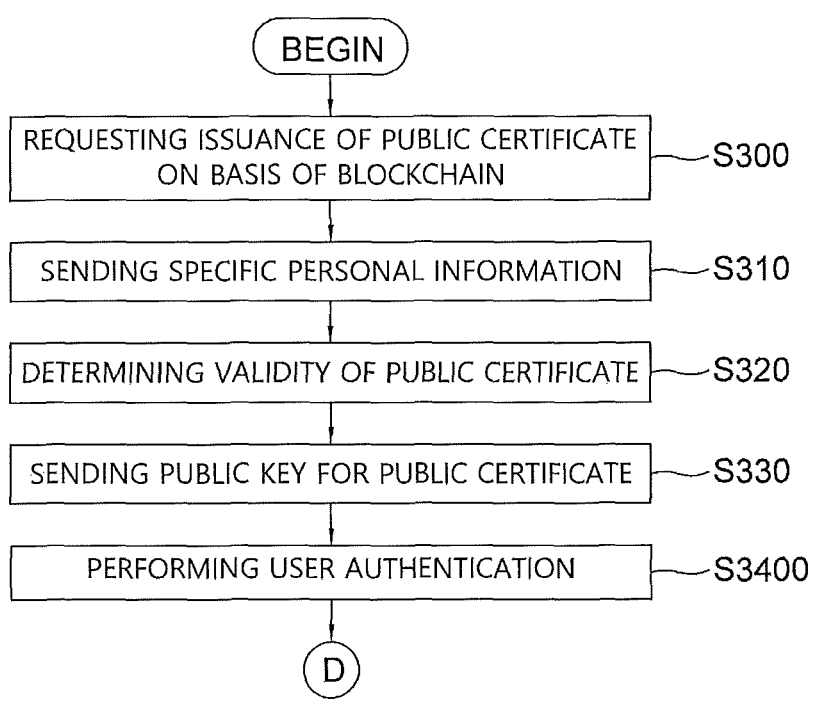
FIGS. 11 to 17 are sequence diagrams illustrating a process of the authentication of the public certificate by using the system for authenticating the public certificate based on the blockchain in accordance with the present invention.
Figure 12:
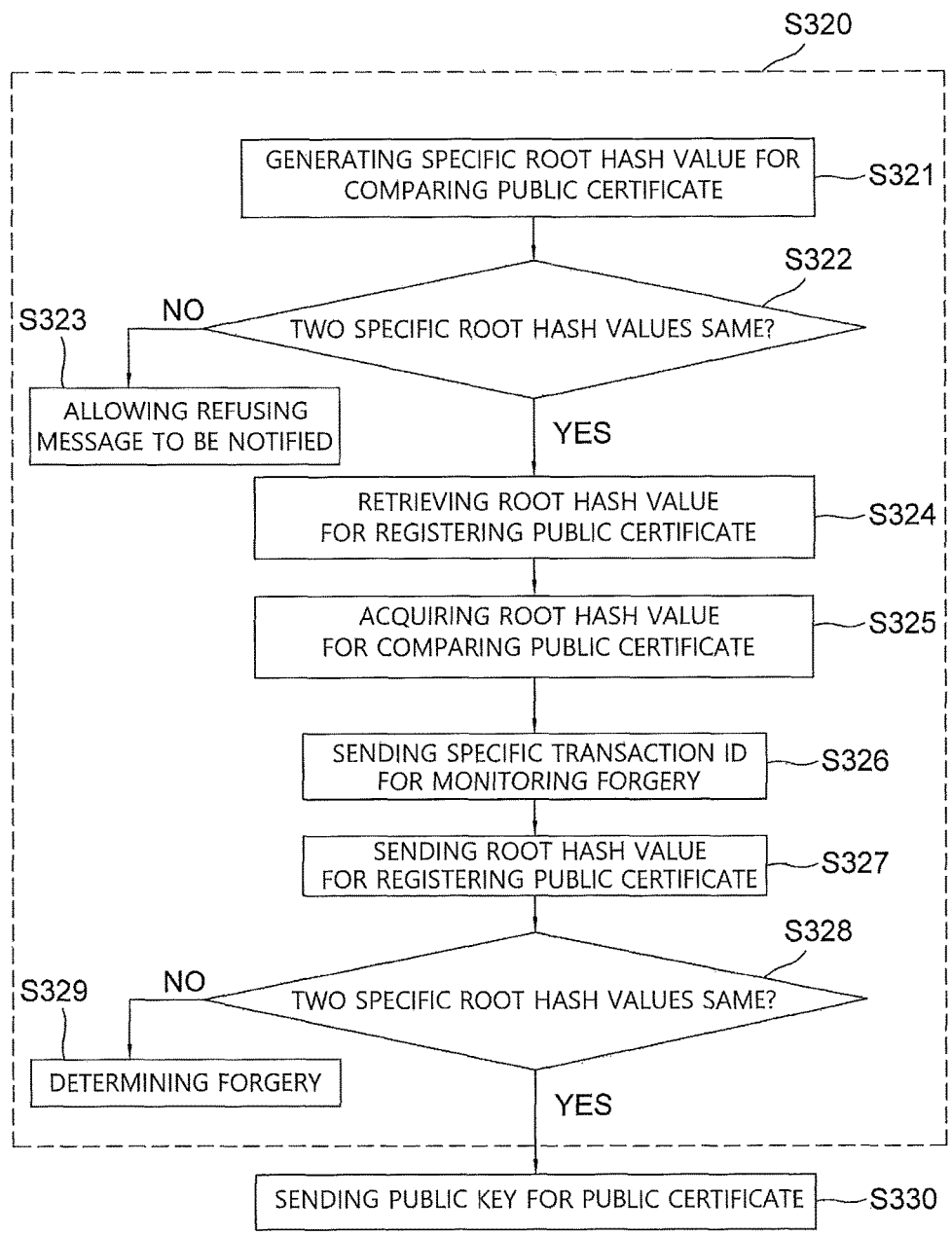
Figure 13:
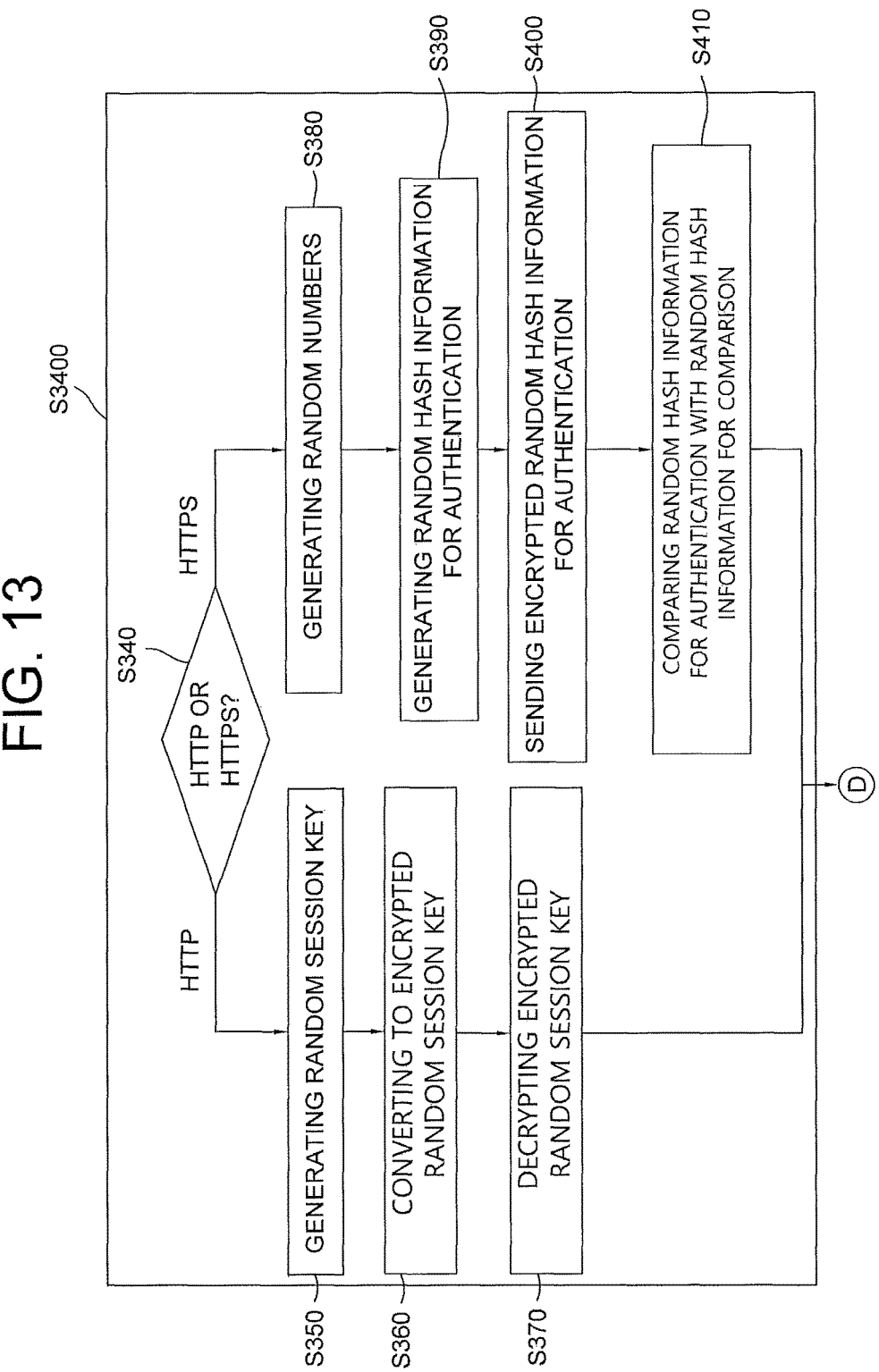
Figure 14:
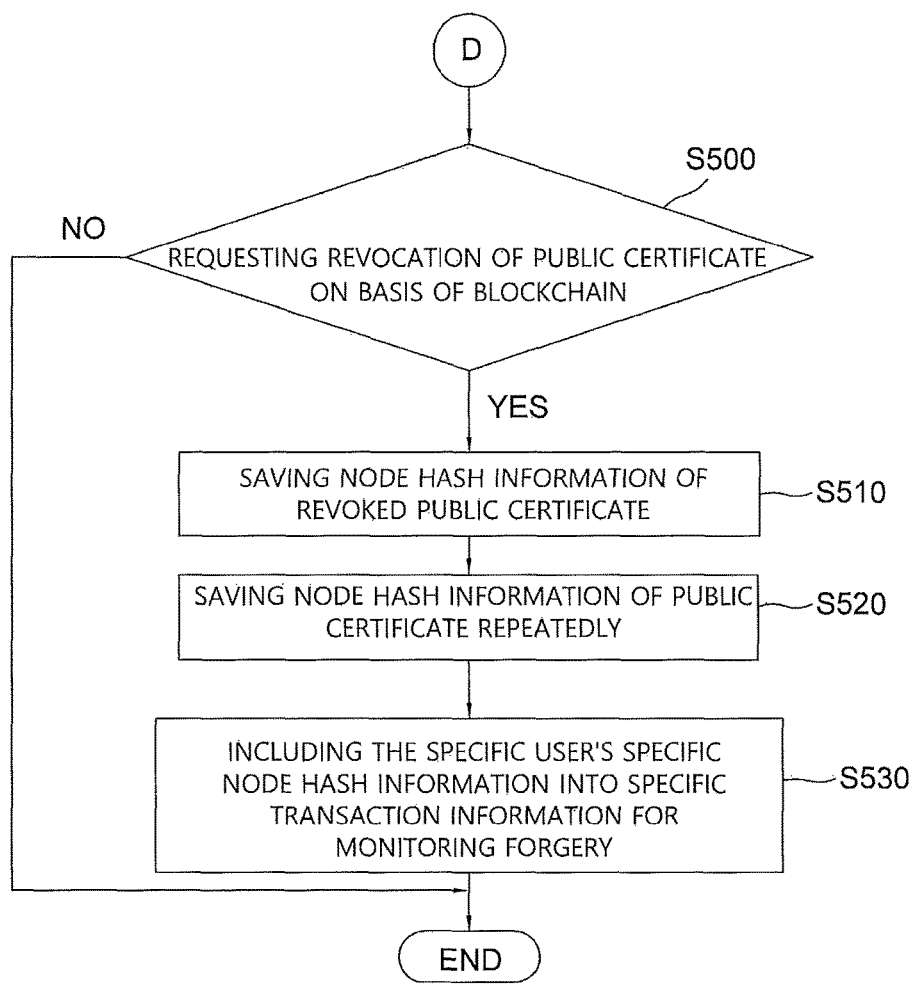
Figure 15:
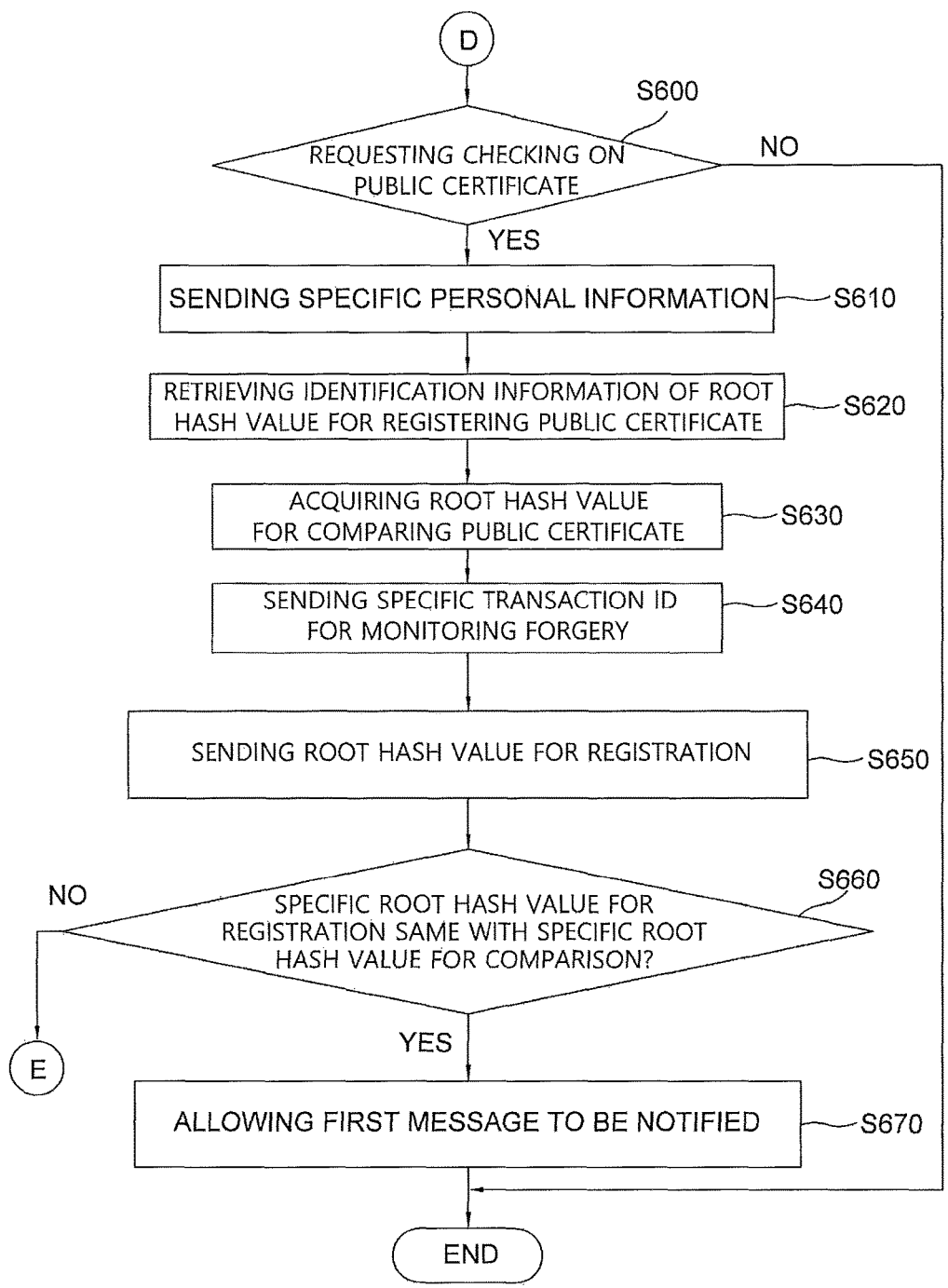
Figure 16:
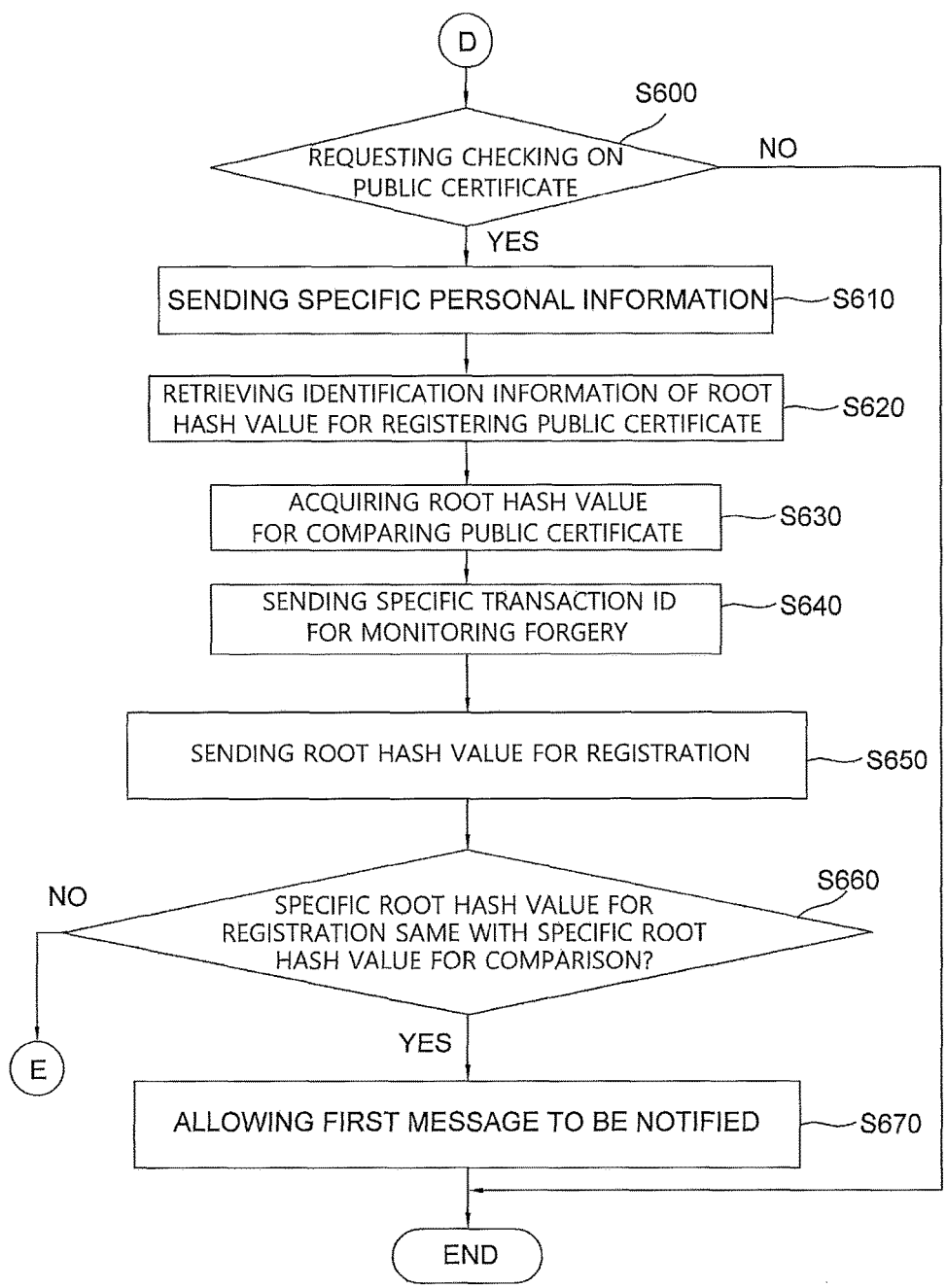
Figure 17:
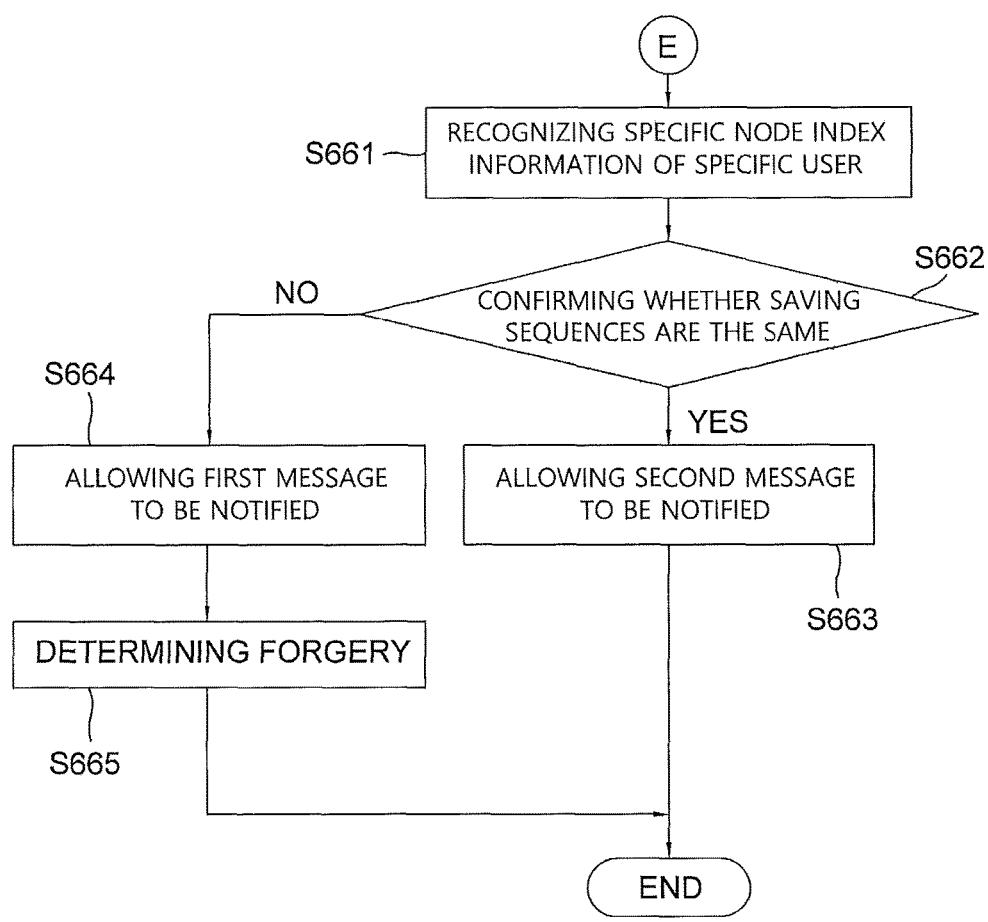

FIGS. 9 to 17 illustrate a method and a system for authenticating the public certificate based on the blockchain.

As illustrated, the system for authenticating the public certificate based on the blockchain in accordance with the present invention may include the user terminal 100, an authentication-requesting server 600, the certificate-managing server 300, the blockchain nodes 400, and the verification-requesting terminal 500.

The authentication-requesting server 600 may include its random number generator 630 and its encrypting engine 640, and may relay a request for the authentication by transmitting personal information for an issuance of the public certificate on a user who operates the user terminal 100, in response to the request for the authentication from the user terminal 100.

For this purpose, the authentication-requesting server 600 may include its DB part 610.

The DB part 610 may store the user identification information on the user who operates the user terminal 100, and may further include the identification information DB 611 which stores personal information containing the user identification information used at a time of the issuance. Herein, the personal information may be stored and transmitted in a form of user-identifying hash information as a result of hashing.

The certificate-managing server 300 may determine a validity of the public certificate by referring to the personal information transmitted from the authentication-requesting server 600, and if the public key is determined as valid, may transmit the public key to the authentication-requesting server 600.

To perform such functions, the certificate-managing server 300 may include its DB part 310 and its hashing engine 320.

First, the DB part 310 may store sequentially and cumulatively, the personal information for each user, the public key, and the node hash information by user acquired by hashing the personal information and the public key, may include the DB 311 for registration information that stores identification information of the specific root hash value for registration which is a root hash value of a Merkle tree containing the stored node hash information, and may include the DB 312 for monitoring forgery that stores the transaction ID for monitoring forgery as an identifier generated along with the transaction information for monitoring forgery every time the transaction information for monitoring forgery is generated.

Based on this, a process of the certificate-managing server 300 determining the validity of the public certificate by referring to the transmitted personal information is described as follows.

First, the certificate-managing server 300 may retrieve the public key from the DB 311 for registration information by referring to the personal information transmitted from the authentication-requesting server 600, and may instruct its hashing engine 320 to acquire node hash information for comparison by hashing the retrieved public key and the transmitted personal information.

Thereafter, the certificate-managing server 300 may retrieve the node hash information for authentication registered when the public certificate is issued, from the DB 311 for registration information.

Thereafter, the certificate-managing server 300 may compare a hash value of the retrieved node hash information for authentication with a hash value of the node hash information for comparison, and if the two hash values are determined as identical to each other, may determine the public certificate is legitimate.

If the two hash values are determined as not identical to each other, the certificate-managing server 300 may allow a refusing message to be transmitted to the user terminal 100, which represents that the authentication of the public certificate is refused.

By these processes, damages to the legitimate users may be minimized by allowing the users to quickly recognize and respond to forgery and preventing illegal use by illegal users via hacking.

Meanwhile, if the specific Merkle tree is determined as authentic, the certificate-managing server 300 may additionally retrieve the identification information of the specific root hash value for registration, which identifies the specific root hash value of a Merkle tree including the node hash information for authentication registered when the public certificate is issued, from the DB 311 for registration information.

Thereafter, the certificate-managing server 300 may retrieve all pieces of the node hash information which comprise a Merkle tree including the specific node hash information from the DB 311 for registration information by referring to the identification information of the specific root hash value for registration, and may instruct its hashing engine 320 to acquire the root hash value for comparison of the Merkle tree including the retrieved pieces of the node hash information.

In addition, the certificate-managing server 300 may retrieve a transaction ID for monitoring forgery from the DB 312 for monitoring forgery by referring to the retrieved identification information of the specific root hash value for registration, and transmit the transaction ID for monitoring forgery to the blockchain nodes 400.

The blockchain nodes 400 may retrieve the transaction information for monitoring forgery therefrom, i.e., the distributed DB, by referring to the transaction ID for monitoring forgery, may extract the specific root hash value for registration included in the transaction information for monitoring forgery, and may transmit the specific root hash values for registration to the certificate-managing server 300.

The certificate-managing server 300 may receive the specific root hash value for registration, and may compare the received specific root hash value for registration with the specific root hash value for comparison, to thereby determine whether the specific Merkle tree is authentic, and if the specific Merkle tree is determined as authentic, may conclude that the public certificate is legitimate.

Also, if there is a specific pair of different hash values which includes a hash value of the root hash value for registration and a hash value of its corresponding root hash value for comparison, the certificate-managing server 300 may determine the specific pair and the other pairs that correspond to the specific Merkle tree as not authentic, the specific Merkle tree including pieces of the specific user's node hash information that have been cumulatively managed on the DB 311 for registration information, and may perform handling of the forgery.

By these processes, the present invention provides a method of monitoring forgery of information related to registration of the issued public certificate of the user in the certificate-managing server 300 every time the authentication is requested, and of enabling the user to quickly recognize and respond to the forgery of information related to the registration stored in the certificate-managing server 300.

Thereafter, the authentication-requesting server 600 may receive the public key and determine whether a protocol used for Internet communications between the user terminals 100 is HTTP or HTTPS.

Herein, the protocol is used for transfer of hypertext documents between a web server and an Internet browser of a user on the Internet, and includes HTTP (Hypertext Transfer Protocol) and HTTPS (Hypertext Transfer Protocol over Secure Socket Layer) whose difference is whether the documents being transferred are encrypted. That is, the documents are transmitted as plain text in HTTP, and as encrypted text in HTTPS.

Thus, the usage environment of HTTP is vulnerable to hacking, as documents are transferred in plain text.

To resolve the risk of hacking and to authenticate the user as a legitimate user of the public certificate, the authentication-requesting server 600 may instruct its random number generator 630 to generate a random session key if the protocol between the user terminals 100 is HTTP.

Thereafter, the authentication-requesting server 600 may instruct its encrypting engine 640 to encrypt the random session key by using the public key included in a validity-confirming signal, to thereby acquire and transmit an encrypted random session key to the user terminal 100.

The user terminal 100 may instruct its decrypting engine 160 to decrypt the encrypted random session key by using the private key stored in the memory 120, to acquire the random session key, and perform the authentication of the user as the legitimate user.

That is, if the user terminal 100 of the user does not have the private key, the decryption cannot be performed and thus the user cannot be verified as the legitimate user.

In addition, in the usage environment of HTTP, because the documents are transmitted over a secure communication line between the user device 100 and the authentication-requesting server 600 using encryption based on the random session key provided by the user terminal 100, the leakage of the private key is prevented, even after the user authentication, and the secure authentication based on the blockchain is performed.

On the other hand, if the protocol is HTTPS, the documents transferred over a communication line between the user terminal 100 and the authentication-requesting server 600 are already encrypted, therefore only thing required is the user authentication.

For this purpose, if the protocol between the user terminals 100 is determined as HTTPS, the authentication-requesting server 600 may instruct the random number generator 630 to acquire random numbers and transmit the random numbers to the user terminal 100.

The user terminal 100 may instruct its hashing engine 140 to acquire random number hash information for authentication by hashing the random numbers.

Thereafter, the user terminal 100 may instruct its encrypting engine 130 to acquire encrypted random number hash information for authentication by using the private key stored in the memory 120, and transmit the encrypted random number hash information for authentication to the authentication-requesting server 600.

The authentication-requesting server 600 may instruct its hashing engine 620 to hash the random numbers, which have been transmitted to the user terminal 100, to thereby acquire random number hash information for comparison.

Thereafter, the authentication-requesting server 600 may instruct its decrypting engine 650 to decrypt the encrypted random number hash information for authentication by using the public key, to thereby acquire the random number hash information for authentication, and may confirm if a hash value of the random number hash information for authentication corresponds to a hash value of the random number hash information for comparison, to thereby perform the authentication of the user.

Meanwhile, the user may revoke the public certificate.

For this purpose, if a request for revocation of the public certificate is acquired from the user terminal 100, the certificate-managing server 300 may update the node hash information of the specific user in the DB 311 for registration information to the node hash information for revocation, and may further store in the DB 311 for registration information the node hash information of the specific user who requested the revocation, to make it available for determining the conditions.

Herein, if said one of the conditions is met, the certificate-managing server 300 may instruct its hashing engine 320 to hash the personal information and the public key for each user according to the saving sequence of the pair of the two, i.e., the personal information and the public key, to thereby acquire the node hash information, and may allow the node hash information of the specific user who requested the revocation to be included in the Merkle tree corresponding to the root hash value for registration which is also included in the transaction information for monitoring forgery transmitted to and registered in the blockchain nodes 400, to thereby guide the user to confirm the revocation of the public certificate of the user.

Further, the auditors may request the audit via the verification-requesting terminal 500 to confirm whether information related to the public certificate is forged.

In order to do so, the DB part 610 of the authentication-requesting server 600 may include an identification information DB 611 which stores the personal information for registration on the user who operates the user terminal 100.

The DB 311 for registration information of the certificate-managing server 300 may store sequentially and cumulatively the personal information and the public key as the node hash information.

By these processes, the verification-requesting terminal 500 may transmit a request for monitoring of the public certificate of the specific user to the authentication-requesting server 600.

Then, the authentication-requesting server 600 may extract the specific personal information on the user who requested the monitoring from the identification information DB 611, and transmit the specific personal information to the certificate-managing server 300.

The certificate-managing server 300 may retrieve the node hash information on the specific user from the DB 311 for registration information by referring to the personal information on the specific user who requested the monitoring, and may retrieve the identification information of the specific root hash value for registration which identifies the specific root hash value of a Merkle tree including the retrieved node hash information on the specific user.

Thereafter, the certificate-managing server 300 may retrieve all pieces of the node hash information which comprise a Merkle tree including the specific node hash information from the DB 311 for registration information by referring to the identification information of the specific root hash value for registration, and may instruct its hashing engine 320 to acquire the root hash value for comparison of the Merkle tree including the retrieved pieces of the node hash information.

In addition, the certificate-managing server 300 may retrieve a transaction ID for monitoring forgery from the DB 312 for monitoring forgery by referring to the retrieved identification information of the specific root hash value for registration, and transmit the transaction ID for monitoring forgery, used for identifying the transaction information for monitoring forgery including the specific root hash value for registration, to the blockchain nodes 400.

The blockchain nodes 400 may retrieve the transaction information for monitoring forgery therefrom, i.e., the distributed DB, by referring to the transaction ID for monitoring forgery, may extract the specific root hash value for registration included in the transaction information for monitoring forgery, and may transmit the specific root hash values for registration to the certificate-managing server 300.

The certificate-managing server 300 may receive the root hash value for registration, may compare a hash value of the received root hash value with a hash value of the generated root hash value for comparison, and if the two hash values are identical to each other, may allow the first message to be notified, which represents that the specific personal information and the specific public key of the specific user, who requested the monitoring to the verification-requesting terminal 500, have not been forged.

If the specific Merkle tree is determined as not authentic, the certificate-managing server 300 may recognize the node index information representing the saving sequence of the specific node hash information that determined the specific Merkle tree as not authentic, from the DB 311 for registration information.

Thereafter, the certificate-managing server 300 may determine if (i) the saving sequence of the node index information on the specific node hash information that determined the specific Merkle tree as not authentic and (ii) the saving sequence of the node index information on the specific user's node hash information are the same.

By these processes, if (i) the saving sequence of the node index information on the specific node hash information that determined the specific Merkle tree as not authentic and (ii) the saving sequence of the node index information on the specific user's node hash information are the same, the certificate-managing server 300 may allow the second message to be notified to the verification-requesting terminal 500, where the second message represents that the specific personal information and the specific public key of the specific user have been forged.

Also, if (i) the saving sequence of the node index information on the specific node hash information that determined the specific Merkle tree as not authentic and (ii) the saving sequence of the node index information on the specific user's node hash information are not the same, the certificate-managing server 300 may allow the first message to be notified to the verification-requesting terminal 500, where the first message represents that the specific personal information and the specific public key of the specific user have not been forged.

Thereafter, the certificate-managing server 300 may determine that the specific pair and said other pairs that correspond to the specific Merkle tree are not authentic, the specific Merkle tree including pieces of the specific user's node hash information that have been cumulatively managed on the DB 311 for registration information, and may perform handling of the forgery.

A process of the authentication of the public certificate based on the blockchain by using the system for authenticating the public certificate based on the blockchain in accordance with the present invention is described as follows.

The user may transmit an authentication request for the public certificate based on the blockchain by connecting to the authentication-requesting server 600 by using the user terminal 100, at a step of S300.

The authentication-requesting server 600 may acquire the personal information on the user, which is processed as the user-identifying hash information, from the identification information DB 611, in response to the authentication request from the user, and may transmit the user-identifying hash information to the certificate-managing server 300, at a step of S310.

The certificate-managing server 300 may confirm the validity of the public certificate based on the transmitted personal information, at a step of S320, and the certificate-managing server 300 may retrieve the public key from the DB 311 for registration information by referring to the personal information transmitted from the authentication-requesting server 600, and may instruct its hashing engine 320 to acquire node hash information for comparison by hashing the retrieved public key and the transmitted personal information, at a step of S321.

Thereafter, the certificate-managing server 300 may retrieve the node hash information for authentication registered when the public certificate is issued, from the DB 311 for registration information, and compare a hash value of the retrieved node hash information for authentication with a hash value of the node hash information for comparison, to thereby determine whether the two hash values are identical to each other, at a step of S322.

Based on this, if the two hash values are determined as not identical to each other, the certificate-managing server 300 may allow the refusing message to be transmitted to the user terminal 100, which represents that the authentication of the public certificate is refused, at a step of S323

Also, if the two hash values are determined as identical to each other, the certificate-managing server 300 may retrieve the identification information of the specific root hash value for registration, which identifies the specific root hash value of a Merkle tree including the node hash information registered when the public certificate is issued, from the DB 311 for registration information, at a step of S324.

Thereafter, the certificate-managing server 300 may retrieve all pieces of the node hash information which comprise a Merkle tree including the specific node hash information from the DB 311 for registration information by referring to the identification information of the specific root hash value for registration, and may instruct its hashing engine 320 to acquire the root hash value for comparison of the Merkle tree including the retrieved pieces of the node hash information, at a step of S325.

Thereafter, the certificate-managing server 300 may retrieve a transaction ID for monitoring forgery from the DB 312 for monitoring forgery by referring to the retrieved identification information of the specific root hash value for registration, and transmit the transaction ID for monitoring forgery to the blockchain nodes 400, at a step of S326.

The blockchain nodes 400 may retrieve the transaction information for monitoring forgery therefrom, i.e., the distributed DB, by referring to the transaction ID for monitoring forgery, may extract the specific root hash value for registration included in the transaction information for monitoring forgery, and may transmit the specific root hash values for registration to the certificate-managing server 300, at a step of S327.

The certificate-managing server 300 may receive the specific root hash value for registration, and may compare the received specific root hash value for registration with the specific root hash value for comparison, to thereby determine whether the specific Merkle tree is authentic, at a step of S328.

If the specific Merkle tree is determined as not authentic, the certificate-managing server 300 may determine that the specific pair and said other pairs that correspond to the specific Merkle tree are not authentic, the specific Merkle tree including pieces of the specific user's node hash information for authentication that have been cumulatively managed on the DB 311 for registration information, at a step of S329, and may perform handling of the forgery.

Then, if a hash value of the retrieved node hash information for authentication is determined as identical to a hash value of the node hash information for comparison, the certificate-managing server 300 may determine that the public certificate is legitimate.

Thus, the certificate-managing server 300 may acquire the public key of the specific user from the DB 311 for registration information, and may transmit the public key to the authentication-requesting server 600, at a step of S330.

The authentication-requesting server 600 may receive the public key and authenticate the user of the user terminal 100 based on the received public key, at a step of S3400 whose detail is as follows.

First, the authentication-requesting server 600 may determine whether the protocol used for Internet communications between the user terminals 100 requesting the authentication is HTTP or HTTPS, at a step of S340.

If the protocol between the user terminals 100 is HTTP, the authentication-requesting server 600 may instruct its random number generator 630 to acquire a random session key, at a step of S350.

The authentication-requesting server 600 may instruct its encrypting engine 640 to encrypt the random session key by using the public key, to thereby acquire and transmit an encrypted random session key to the user terminal 100, at a step of S360.

The user terminal 100 may receive the encrypted random session key, instruct its decrypting engine 160 to decrypt the encrypted random session key by using the private key stored in the memory 120, and to acquire the random session key, and may complete the authentication of the user, at a step of S370.

Then, if the protocol between the user terminals 100 requesting the authentication is HTTPS, the authentication-requesting server 600 may instruct its random number generator 630 to acquire random numbers and transmit the random numbers to the user terminal 100, at a step of S380.

The user terminal 100 may instruct its hashing engine 140 to acquire random number hash information for authentication by hashing the random numbers, at a step of S390.

The user terminal 100 may instruct its encrypting engine 130 to acquire encrypted random number hash information for authentication by using the private key stored in the memory 120, and transmit the encrypted random number hash information for authentication to the authentication-requesting server 600, at a step of S400.

The authentication-requesting server 600 may instruct its hashing engine 620 to hash the random numbers, which have been transmitted to the user terminal 100, to acquire random number hash information for comparison, may instruct its decrypting engine 650 to decrypt the encrypted random number hash information for authentication by using the public key of the user to acquire the random number hash information for authentication, and may confirm if a hash value of the random number hash information for authentication is identical to a hash value of the random number hash information for comparison, to thereby perform the authentication of the user, at a step of S410.

Meanwhile, the user may revoke the public certificate.

In order to do so, the certificate-managing server 300 may confirm whether the user terminal 100 requested the revocation of the public certificate, at a step of S500, and if the revocation is determined as requested, may update the node hash information of the specific user stored in the DB 311 for registration information to node hash information for revocation, at a step of S510.

Thereafter, the certificate-managing server 300 may further store in the DB 311 for registration information the node hash information of the specific user who requested the revocation, to make it available for determining the conditions.

Thereafter, if said one of the conditions is met, the certificate-managing server 300 may instruct its hashing engine 320 to hash the personal information and the public key for each user according to the saving sequence of the pair of the two, i.e., the personal information and the public key, to thereby acquire the node hash information, and may allow the node hash information of the specific user, who requested the revocation, to be included in the Merkle tree corresponding to the root hash value for registration which is also included in the transaction information for monitoring forgery transmitted to and registered in the distributed DB, i.e., the blockchain nodes 400, at a step of S530.

As a result, the user may be allowed to confirm the revocation of the public certificate of the user.

Further, the auditors who audits an individual user or the public certificate may request the audit via the verification-requesting terminal 500 to confirm whether information related to the public certificate is forged.

That is, the authentication-requesting server 600 may instruct the verification-requesting terminal 500 to determine whether monitoring of the public certificate of the specific user has been requested, at a step of S600, and if the monitoring is determined to have been requested, may extract the specific personal information of the specific user who requested the monitoring thereon from the DB 311 for registration information, and may transmit the specific personal information to the certificate-managing server 300, at a step of S610.

The certificate-managing server 300 may retrieve the node hash information on the specific user from the DB 311 for registration information by referring to the personal information on the specific user who requested the monitoring, and may retrieve the identification information of the specific root hash value for registration which identifies the specific root hash value of a Merkle tree including the retrieved node hash information on the specific user, at a step of S620.

Thereafter, the certificate-managing server 300 may retrieve all pieces of the node hash information which comprise a Merkle tree including the specific node hash information from the DB 311 for registration information by referring to the identification information of the specific root hash value for registration, and may instruct its hashing engine 320 to acquire the root hash value for comparison of the Merkle tree including the retrieved pieces of the node hash information, at a step of S630.

Thereafter, the certificate-managing server 300 may retrieve a transaction ID for monitoring forgery from the DB 312 for monitoring forgery by referring to the retrieved identification information of the specific root hash value for registration, and transmit the transaction ID for monitoring forgery to the blockchain nodes 400, at a step of S640.

The blockchain nodes 400 may retrieve the transaction information for monitoring forgery therefrom, i.e., the distributed DB, by referring to the transaction ID for monitoring forgery, may extract the specific root hash value for registration included in the transaction information for monitoring forgery, and may transmit the specific root hash values for registration to the certificate-managing server 300, at a step of S650.

The certificate-managing server 300 may receive the specific root hash value for registration, and may compare the received specific root hash value for registration with the specific root hash value for comparison, to thereby determine whether the specific Merkle tree is authentic, at a step of 660.

Thereafter, if the specific Merkle tree is determined as authentic, the certificate-managing server 300 may allow the first message to be notified, which represents that the specific personal information and the specific public key of the specific user, who requested the monitoring to the verification-requesting terminal 500, have not been forged, at a step of S670.

If the specific Merkle tree is determined as not authentic, the certificate-managing server 300 may recognize the node index information representing the saving sequence of the specific node hash information that determined the specific Merkle tree as not authentic, from the DB 311 for registration information, at a step of S661.

Thereafter, the certificate-managing server 300 may determine if (i) the saving sequence of the node index information on the specific node hash information that determined the specific Merkle tree as not authentic and (ii) the saving sequence of the node index information on the specific user's node hash information are the same, at a step of S662.

First, if (i) the saving sequence of the node index information on the specific node hash information that determined the specific Merkle tree as not authentic and (ii) the saving sequence of the node index information on the specific user's node hash information are the same, the certificate-managing server 300 may allow the second message to be notified to the verification-requesting terminal 500, where the second message represents that the specific personal information and the specific public key of the specific user have been forged, at a step of S663.

Also, if (i) the saving sequence of the node index information on the specific node hash information that determined the specific Merkle tree as not authentic and (ii) the saving sequence of the node index information on the specific user's node hash information are not the same, the certificate-managing server 300 may allow the first message to be notified to the verification-requesting terminal 500, where the first message represents that the specific personal information and the specific public key of the specific user have not been forged, at a step of S664.

Thereafter, the certificate-managing server 300 may determine the specific pair and said other pairs that correspond to the specific Merkle tree as not authentic, the specific Merkle tree including pieces of the specific user's node hash information that have been cumulatively managed on the DB 311 for registration information, at a step of S665, and may perform handling of the forgery.

The present invention has an effect of reducing a cost to construct the system for issuing the public certificate which is linked with a high level security system to block hacking as much as possible, due to the fact that the public key for the public certificate, which requires maintenance, is saved and managed on the blockchain through a peer-to-peer (P2P) network based distributed DB instead of being saved and managed on a certificate authority (CA) operating server, of reducing system related costs such as operating and maintenance cost of the constructed system for issuing the public certificate on the basis of the blockchain, and of greatly reducing an issuing cost of the public certificate.

The present invention has another effect of binding the specific user's public key for the public certificate as much as the predetermined number of public keys, compressing the bound specific public keys, and registering specific transaction information that includes the compressed specific user's specific public key list in order to minimize the occurrence of traffics, to thereby also minimize the network overload while registering the specific transaction information to the blockchain where the specific transaction information includes the specific user's public key, in the process of issuing the public certificate.

The present invention has still another effect of performing an authentication process of the public certificate without exposure of the public key when issuing the public certificate by preventing the specific user's public key from being registered in the blockchain, and of monitoring forgery and falsification of public authentication related information that includes the specific public key of the specific user.

What is claimed is:

1. A system for issuing a public certificate based on a blockchain, comprising:
   a user terminal generating a specific public key for the public certificate and a specific private key for the public certificate, and transmitting the specific public key and specific personal information for issuing the public certificate including personal information on a specific user, required for issuing the public certificate;
   an issuance-requesting server receiving the specific personal information and the specific public key from the user terminal, and transmitting a registration-requesting signal for registering the public certificate for each user including the specific personal information and the specific public key;
   wherein, conditions include:
   (i) a numeric condition representing a condition of determining whether a number of pairs, including
      (i-1) a specific pair of the specific user's personal information and the specific public key and (i-2) other pairs of associated users' personal information and associated public keys, reaches a needed number for creation of a root hash value, and (ii) a temporal condition representing a condition of completing each Merkle tree at predetermined intervals;

a certificate-managing server device:

(i) storing, for each user, sequentially and cumulatively the specific public key and the specific personal information included in the registration-requesting signal from the issuance-requesting server in a database for registration information, (ii) once one of conditions is met, instructing its first hashing engine to sequentially hash each of pairs of the specific public key and the specific personal information to acquire each piece of node hash information in a specific Merkle tree, (iii) obtaining at least one specific root hash value for registration of the public certificate of a specific Merkle tree by using said each piece of the node hash information, (iv) instructing a transaction-processing engine of the certificate managing server to generate (iv-1) transaction information for monitoring forgery including the at least one specific root hash value and (iv-2) a transaction ID for monitoring forgery used as a key value for searching the transaction information for monitoring forgery, and (v) transmitting the transaction information for monitoring forgery; and the blockchain, including blockchain nodes, storing the transaction information for monitoring forgery received from the certificate-managing server device, wherein the blockchain nodes authorize a cryptocurrency payment through verification of transaction information for cryptocurrency payment if the transaction information for the cryptocurrency payment is received, and store the transaction information for the cryptocurrency payment in the blockchain by referring to a result of the authorizing process.

2. The system of claim 1, wherein the user terminal includes a key-generating engine, and instructs the key-generating engine to generate the specific public key and the specific private key while network is being disconnected.

3. The system of claim 1, wherein the specific personal information includes at least one of a name of the specific user, a birth date of the specific user, a phone number of the specific user, and an e-mail address of the specific user.

4. The system of claim 1, wherein the issuance-requesting server includes its hashing engine, and instructs its hashing engine to hash the specific personal information, to thereby acquire and allow user-identifying hash information to be included in the registration-requesting signal.

5. The system of claim 1, wherein the certificate-managing server device includes a database part, wherein the database part contains a database for registration information which stores sequentially and cumulatively, the specific personal information, the specific public key, and node hash information acquired by hashing the specific personal information and the specific public key, and contains a database for monitoring forgery which stores a transaction ID for monitoring forgery, generated along with the transaction information for monitoring forgery every time the transaction information for monitoring forgery is generated at the certificate-managing server device, wherein the certificate-managing server device, if said one of conditions is met, extracts all of previous transaction IDs for monitoring forgery of previous Merkle trees that have been cumulatively saved before completion of the specific Merkle tree in the database for monitoring forgery, and transmits the previous transaction IDs for monitoring forgery to the blockchain including the blockchain nodes, wherein the blockchain nodes retrieve the transaction information for monitoring forgery therefrom by referring to the previous transaction IDs for monitoring forgery, extract the at least one specific root hash value for registration included in the transaction information for monitoring forgery, and transmit the at least one specific root hash value for registration to the certificate-managing server device, and wherein the certificate-managing device (i) receives the at least one specific root hash value for registration, (ii) hashes previous pairs of each piece of personal information and each public key that have been cumulatively saved before the completion of the specific Merkle tree from the database for registration information, to thereby acquire each of previous root hash values for comparison, (iii) compares each of the at least one specific root hash value for registration with each of the previous root hash values for comparison sequentially, to thereby determine whether the previous Merkle trees are authentic, (iv) allows the transaction information for monitoring forgery to be generated if the previous Merkle trees are determined as authentic, and prevents the transaction information for monitoring forgery from being generated if the previous Merkle trees are determined as not authentic.

6. The system of claim 1, wherein the certificate-managing server device includes a database part, wherein the database part contains a database for registration information which stores sequentially and cumulatively, the specific personal information, the specific public key, and node hash information acquired by hashing the specific personal information and the specific public key, and contains a database for monitoring forgery which stores a transaction ID for monitoring forgery, generated along with the transaction information for monitoring forgery every time the transaction information for monitoring forgery is generated at the certificate-managing server device, wherein the certificate-managing server device (i) generates node index information representing saving sequence of the node hash information being generated, (ii) generates identification information of the specific root hash value being generated, (iii) stores cumulatively in the database for registration information the node hash information, the node index information, and the identification information of the specific root hash value, and (iv) stores cumulatively the identification information of the specific root hash value in the database for monitoring forgery, and wherein a transaction-processing engine of the issuance-requesting server stores cumulatively the transaction ID for monitoring forgery in the database for monitoring forgery, to thereby instruct the database for monitoring forgery to store and manage the transaction ID for monitoring forgery and the identification information of the specific root hash value.

7. The system of claim 6, wherein, on condition that a certain previous root hash value has been allotted to a first leaf node of a particular previous Merkle tree, the certificate-managing server device instructs the first hashing engine to obtain a particular previous root hash value for registration of the particular previous Merkle tree.

8. The system of claim 7, further comprising:
a verification-requesting terminal,
wherein the verification-requesting terminal transmits a request for monitoring of the public certificate of the specific user to the issuance-requesting server,
wherein the issuance-requesting server retrieves the specific personal information on the specific user who requested the monitoring from a database for registration information, and transmits the specific personal information to the certificate-managing server device,
wherein the certificate-managing server device
  (i) confirms a presence of the node hash information on the specific user in the database for registration information by referring to the transmitted specific personal information on the specific user who requested the monitoring,
  (ii) if the specific node hash information does not exist, instructs the first hashing engine to sequentially hash each of the pairs that does not have node hash information to thereby acquire node hash information of the pairs that do not have node hash information,
  (iii) generates specific node index information of the pairs that do not have node hash information,
  (iv) obtains the specific root hash value for registration by using said each node hash information acquired from the pairs that do not have node hash information,
  (v) generates identification information of the specific root hash value for registration,
  (vi) instructs its transaction-processing engine to generate
    (vi-1) transaction information for monitoring forgery including the specific root hash value for registration and
    (vi-2) a transaction ID for monitoring forgery used as a key value for searching the transaction information for monitoring forgery, and
  (vii) transmits the transaction information for monitoring forgery to the blockchain,
wherein the blockchain nodes store the received specific transaction information therein,
wherein the certificate-managing server device instructs the first hashing engine to generate a specific root hash value for comparison by referring to a structure of the specific Merkle tree and the identification information of the specific root hash value for registration, and transmits the specific transaction ID for monitoring forgery to the blockchain by referring to the identification information of the specific root hash value for registration,
wherein the blockchain nodes retrieves the specific transaction information for monitoring forgery therefrom by referring to the specific transaction ID for monitoring forgery, extracts the specific root hash value for registration included in the specific transaction information for monitoring forgery, and transmits the specific root hash values for registration to the certificate-managing server device, and
wherein the certificate-managing server device receives the specific root hash values for registration, compares a hash value of the received specific root hash value for registration with a hash value of the generated root hash value for comparison, and if the hash value of the received specific root hash value for registration and the hash value of the generated root hash value for comparison are identical to each other, determines the specific Merkle tree as authentic, and allows a first message to be notified, which represents that the specific personal information and the specific public key of the specific user, who requested the monitoring to the verification-requesting terminal, have not been forged.

9. The system of claim 8, wherein the certificate-managing server device, (i) if the specific Merkle tree is determined as not authentic, confirms whether (i-1) a saving sequence of the specific node hash information that determined the specific Merkle tree as not authentic and (i-2) a saving sequence of the specific user's node hash information are the same, and (ii) if (ii-1) the saving sequence of the specific node hash information that determined the specific Merkle tree as not authentic and (ii-2) the saving sequence of the specific user's node hash information are the same, allows a second message to be notified to the verification-requesting terminal, wherein the second message represents that the specific personal information and the specific public key of the specific user have been forged.

10. The system of claim 9, wherein, if (i) the saving sequence of the specific node hash information, among the node hash information corresponding to the specific root hash value for registration, that determined the specific Merkle tree as not authentic and (ii) the saving sequence of the specific user's node hash information are not the same, the certificate-managing server device allows the first message to be notified to the verification-requesting terminal.

11. A method of issuing a public certificate based on basis of a blockchain including a plurality of blockchain nodes comprising:
a user terminal sending specific personal information for issuing the public certificate to an issuance-requesting server for requesting an issuance of the public certificate on the basis of the blockchain, wherein the specific personal information includes user identification information needed for the issuance;
the issuance-requesting server confirming the received specific personal information, creating a generation-guiding signal for guiding a creation of a specific private key for the public certificate and a specific public key for the public certificate, and sending the generation-guiding signal to the user terminal which requested the issuance;
the user terminal, if the generation-guiding signal is received, managing a key-generating engine to generate the specific public key and the specific private key, and sending the specific public key to the issuance-requesting server;
the issuance-requesting server receiving the specific public key and sending a registration-requesting signal for registering the public certificate for each user, the registration-requesting signal including the specific personal information and the specific public key, to a certificate-managing server device for managing the public certificate;
the certificate-managing server device saving the specific personal information and the specific public key included in the received registration-requesting signal in a database for registration information containing information regarding a registration of public certificates sequentially and cumulatively;

the certificate-managing server device confirming whether one of conditions is met, wherein the conditions include (i) a numeric condition and (ii) a temporal condition, and wherein the numeric condition represents a condition of determining whether the number of pairs, including a specific pair of the specific user's personal information and the specific public key and other pairs of associated users' personal information and associated public keys, reaches a needed number for creation of a root hash value and wherein the temporal condition represents a condition of completing each Merkle tree at predetermined intervals;

the certificate-managing server device, if said one of the conditions is met, operating a first hashing engine of the certificate-managing server device to hash each of the pairs sequentially to thereby acquire each node hash information in a specific Merkle tree, and obtaining a specific root hash value for registration, which is used for registering the public certificate, by using said each node hash information;

the certificate-managing server device operating a transaction-processing engine to create (i) specific transaction information for monitoring forgery including the specific root hash value for registration and (ii) a specific transaction ID for monitoring forgery which is used as a key value to search the specific transaction information for monitoring forgery, and sending the specific transaction information for monitoring forgery to the blockchain; and the blockchain recording the received specific transaction information for monitoring forgery therein, to thereby complete the issuance.

12. The method of claim 11, wherein the issuance-requesting server instructs a second hashing engine of the issuance-requesting server to hash the specific personal information to thereby acquire user-identifying hash information, and includes the user-identifying hash information in the registration-requesting signal.

13. The method of claim 11 further comprising:
the certificate-managing server device, if said one of the conditions is met, extracting all of previous transaction IDs of previous Merkle trees that have been cumulatively saved before the completion of a specific Merkle tree in a database for monitoring forgery, and sending the previous transaction IDs to the blockchain;

the blockchain retrieving each piece of previous transaction information for monitoring forgery from the blockchain by referring to the each piece of the received previous transaction IDs and extracting each of previous root hash values for registration of previous public certificates included in each piece of the previous transaction information for monitoring forgery;

the blockchain sending each of the previous root hash values for registration to the certificate-managing server device;

the certificate-managing server device receiving each of the previous root hash values for registration of the previous public certificates, hashing previous pairs of each previous user's personal information and each previous user's public keys that have been cumulatively saved before the completion of the specific Merkle tree from the database for registration information, to thereby acquire each of the previous root hash values for comparison; and the certificate-managing server device comparing each of the previous root hash values for registration with each of the previous root hash values for comparison sequentially, to thereby determine whether the previous Merkle trees are authentic; and entering the step of S210.

14. The method of claim 13 further including:
if the previous Merkle trees are determined as not authentic, determining that at least one of the previous pairs has been forged.

15. The method of claim 11, wherein on condition that a certain previous root hash value for registration in a certain previous Merkle tree has been allotted to a first leaf node of a particular previous Merkle tree, wherein the particular previous Merkle tree has been created right after the completion of the certain previous Merkle tree, the certificate-managing server device uses the first hashing engine to obtain a particular previous root hash value for registration from the certain previous root hash value.

16. The method of claim 11 the certificate-managing server device, by utilizing the first hashing engine, generates node index information representing saving sequence of the node hash information, and generates identification information of the specific root hash value for registration.

17. The method of claim 16, further comprising:
a verification-requesting terminal for examining forgery and falsification confirming whether a monitoring of the specific user's public certificate has been requested through the issuance-requesting server;

the verification-requesting terminal, if the monitoring is determined to have been requested, extracting the specific personal information of the specific user that requested the monitoring thereon from the database for registration information, and sending the specific personal information to the certificate-managing server device;

the certificate-managing server device confirming whether the specific node hash information of the specific user exists in the database for registration information by referring to the specific personal information;

the certificate-managing server device, if the specific node hash information does not exist, operating the first hashing engine to sequentially hash each of the pairs that does not have node hash information to thereby acquire node hash information of the pairs that do not have node hash information, generating specific node index information of the pairs that do not have node hash information, obtaining the specific root hash values for registration by using said each node hash information acquired from the pairs that do not have node hash information and generating identification information of the specific root hash value for registration;

the certificate-managing server device operating the transaction-processing engine to create (i) the specific transaction information for monitoring forgery acquired from the pairs that do not have node hash information and (ii) the specific transaction ID for monitoring forgery, acquired from the pairs that do not have node hash information, which is used as a key value to search the specific transaction information for monitoring forgery, and sending the specific transaction information for monitoring forgery to the blockchain;

the blockchain recording the received specific transaction information for monitoring forgery therein;

the first hashing engine generating a specific root hash value for comparison by referring to a structure of the specific Merkle tree and the identification information of the specific root hash value for registration;

the certificate-managing server device sending the specific transaction ID for monitoring forgery to the blockchain by referring to the identification information of the specific root hash value for registration;

the blockchain retrieving the specific transaction information for monitoring forgery therefrom by referring to the specific transaction ID for monitoring forgery, extracting the specific root hash value for registration included in the specific transaction information for monitoring forgery, and sending the specific root hash value for registration to the certificate-managing server device;

the certificate-managing server device receiving the specific root hash value for registration, and comparing the received specific root hash value for registration with the specific root hash value for comparison, to thereby determine whether the specific Merkle tree is authentic; and the certificate-managing server device, if the specific Merkle tree is determined as authentic, allowing a first message to be notified, wherein the first message represents that the specific personal information and the specific public key of the specific user, who requested the monitoring to the verification-requesting terminal, have not been forged.

18. The method of claim 17 further comprising:

the first hashing engine, if the specific Merkle tree is determined as not authentic, recognizing the specific node index information of the specific user's public certificate among the node hash information comprising the previous Merkle tree;

confirming whether the saving sequence of the specific node hash information that determined the specific Merkle tree as not authentic and the saving sequence of the specific user's node hash information are the same; and the certificate-managing server device, if the saving sequence of the specific node hash information that determined the specific Merkle tree as not authentic and the saving sequence of the specific user's node hash information are the same, allowing a second message to be notified to the verification-requesting terminal, wherein the second message represents that the specific personal information and the specific public key of the specific user have been forged.

19. The method of claim 18 further comprising:

the certificate-managing server device, if the saving sequence of the specific node hash information that determined the specific Merkle tree as not authentic and the saving sequence of the specific user's node hash information are different, allowing the first message to be notified to the verification-requesting terminal; and the first hashing engine determining the specific pair and the other pairs that correspond to the specific Merkle tree as not authentic, the specific Merkle tree including pieces of the specific user's node hash information that have been cumulatively managed on the database for registration information.

* * * * *